(12) United States Patent
Kawai et al.

(10) Patent No.: US 12,358,640 B2
(45) Date of Patent: Jul. 15, 2025

(54) AIRCRAFT WITH A MULTI-WALLED FUEL TANK AND A METHOD OF MANUFACTURING

(71) Applicant: JETZERO, INC., Long Beach, CA (US)

(72) Inventors: Ronald Tatsuji Kawai, Rancho Palos Verdes, CA (US); Blaine Knight Rawdon, Long Beach, CA (US)

(73) Assignee: JETZERO, INC., Long Beach, CA (US)

( * ) Notice: Subject to any disclaimer, the term of this patent is extended or adjusted under 35 U.S.C. 154(b) by 0 days.

(21) Appl. No.: 18/200,668

(22) Filed: May 23, 2023

(65) Prior Publication Data

US 2023/0348091 A1 Nov. 2, 2023

Related U.S. Application Data

(63) Continuation-in-part of application No. 17/731,772, filed on Apr. 28, 2022, now Pat. No. 11,697,507.

(51) Int. Cl.
*F17C 1/12* (2006.01)
*B64C 39/10* (2006.01)
*B64D 37/30* (2006.01)

(52) U.S. Cl.
CPC .............. *B64D 37/30* (2013.01); *B64C 39/10* (2013.01); *B64C 2039/105* (2013.01)

(58) Field of Classification Search
CPC ........ B64D 39/10; B64D 37/30; B64D 37/00; F17C 2260/037; F17C 2203/0358; F17C 1/12; F17C 3/04; B64C 2039/105
See application file for complete search history.

(56) References Cited

U.S. PATENT DOCUMENTS

| | | | |
|---|---|---|---|
| 5,157,888 A | 10/1992 | Lindquist | |
| 5,171,346 A * | 12/1992 | Hallett | B29C 41/06 264/46.7 |
| 5,232,119 A | 8/1993 | Kauffman | |
| 5,501,359 A * | 3/1996 | Chauvin | F17C 3/04 220/560.12 |
| 6,182,710 B1 | 2/2001 | Webb | |
| 6,193,917 B1 | 2/2001 | Delay | |
| 6,868,981 B2 | 3/2005 | Rosen et al. | |
| 7,743,940 B2 | 6/2010 | Brunnhofer | |
| 8,418,718 B2 | 4/2013 | Hebblethwaite | |

(Continued)

FOREIGN PATENT DOCUMENTS

EP 0556814 A1 8/1993

OTHER PUBLICATIONS

N/A, UL-142 Tanks, Mar. 7, 2022.
S. Senthil Kumar et al , Design and Analysis of Hydrogen Storage Tank with Different Materials by Ansys, Dec. 31, 2020.

*Primary Examiner* — Stephen J Castellano
(74) *Attorney, Agent, or Firm* — Caldwell intellectual Property Law

(57) ABSTRACT

An aircraft with a multi-walled fuel tank and method of manufacturing is presented. The aircraft includes a blended wing body and a fuel tank attached to the blended wing body configured to store liquified gas fuel. The fuel tank includes an inner wall, outer wall, and interstitial volume in between that is filled with insulation. The interstitial volume includes a reflective film layer and a structural insulation layer.

19 Claims, 20 Drawing Sheets

(56) References Cited

U.S. PATENT DOCUMENTS

| | | | |
|---|---|---|---|
| 11,993,391 B1* | 5/2024 | Piasecki | B64D 37/30 |
| 2002/0092562 A1* | 7/2002 | Kami | B60K 15/03006 |
| | | | 137/312 |
| 2008/0006743 A1* | 1/2008 | Miller | B64U 10/25 |
| | | | 244/53 R |
| 2008/0307798 A1* | 12/2008 | Luo | F17C 13/02 |
| | | | 220/560.12 |
| 2009/0263315 A1* | 10/2009 | Mehta | F17C 1/00 |
| | | | 156/69 |
| 2009/0283176 A1* | 11/2009 | Berry | F17C 13/001 |
| | | | 220/560.12 |
| 2009/0321452 A1* | 12/2009 | Wiertz | F16L 59/065 |
| | | | 220/560.12 |
| 2010/0059528 A1 | 3/2010 | Zhevago et al. | |
| 2010/0146992 A1 | 6/2010 | Miller | |
| 2014/0360891 A1* | 12/2014 | Kline | B65D 85/70 |
| | | | 206/0.7 |
| 2018/0231182 A1* | 8/2018 | Posselt | F17C 3/04 |
| 2023/0228379 A1* | 7/2023 | Park | F17C 3/027 |
| | | | 220/560.15 |

* cited by examiner

AIRCRAFT WITH A MULTI-WALLED FUEL TANK AND A METHOD OF MANUFACTURING

CROSS-REFERENCE TO RELATED APPLICATIONS

This application is a continuation-in-part of Non-provisional application Ser. No. 17/731,772 filed on Apr. 28, 2022, and entitled "AN AIRCRAFT WITH A MULTI-WALLED FUEL TANK AND A METHOD OF MANUFACTURING," the entirety of which is incorporated herein by reference.

FIELD OF THE INVENTION

The present invention generally relates to the field of aircraft. In particular, the present invention is directed to an aircraft with a multi-walled fuel tank and a method of manufacturing.

BACKGROUND

Hydrogen fuel has characteristics favorable as an aviation fuel. Hydrogen fuel needs to be stored in a liquid form to minimize volume and maximize efficient flight. Storage of hydrogen fuel within an aircraft is limited by the weight of the storage tank. Existing solutions are not satisfactory.

SUMMARY OF THE DISCLOSURE

In an aspect an aircraft with at least a multi-walled fuel tank includes a blended wing body, and at least a fuel tank attached to the blended wing body and configured to store liquified gas fuel, wherein the at least a fuel tank further comprises: an inner wall, an outer wall, an interstitial volume between the inner wall and the outer wall comprising of at least a reflective film layer and at least a structural insulation layer.

In another aspect a method of manufacturing at least a multi-walled fuel tank for an aircraft includes receiving a blended wing body, receiving an inner wall, receiving an outer wall, inserting an interstitial volume comprising at least a reflective film layer and at least a structural insulation layer between the inner wall and the outer wall.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an aircraft with a multi-walled fuel tank and a method of manufacturing. Aspects of the present disclosure include a blended wing body. Aspects of this present disclosure include storing liquified gas fuel in a fuel tank. Aspects of the present disclosure further includes a vent configured to vent gaseous fuel from the tank and an insulation to reduce thermal transfer to the liquified gas fuel inside. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper," "lower," "left," "rear," "right," "front," "vertical," "horizontal," and derivatives thereof relate to embodiments oriented as shown for exemplary purposes in FIG. 1. Furthermore, there is no intention to be bound by any expressed or implied theory presented in this disclosure.

Figure 1:
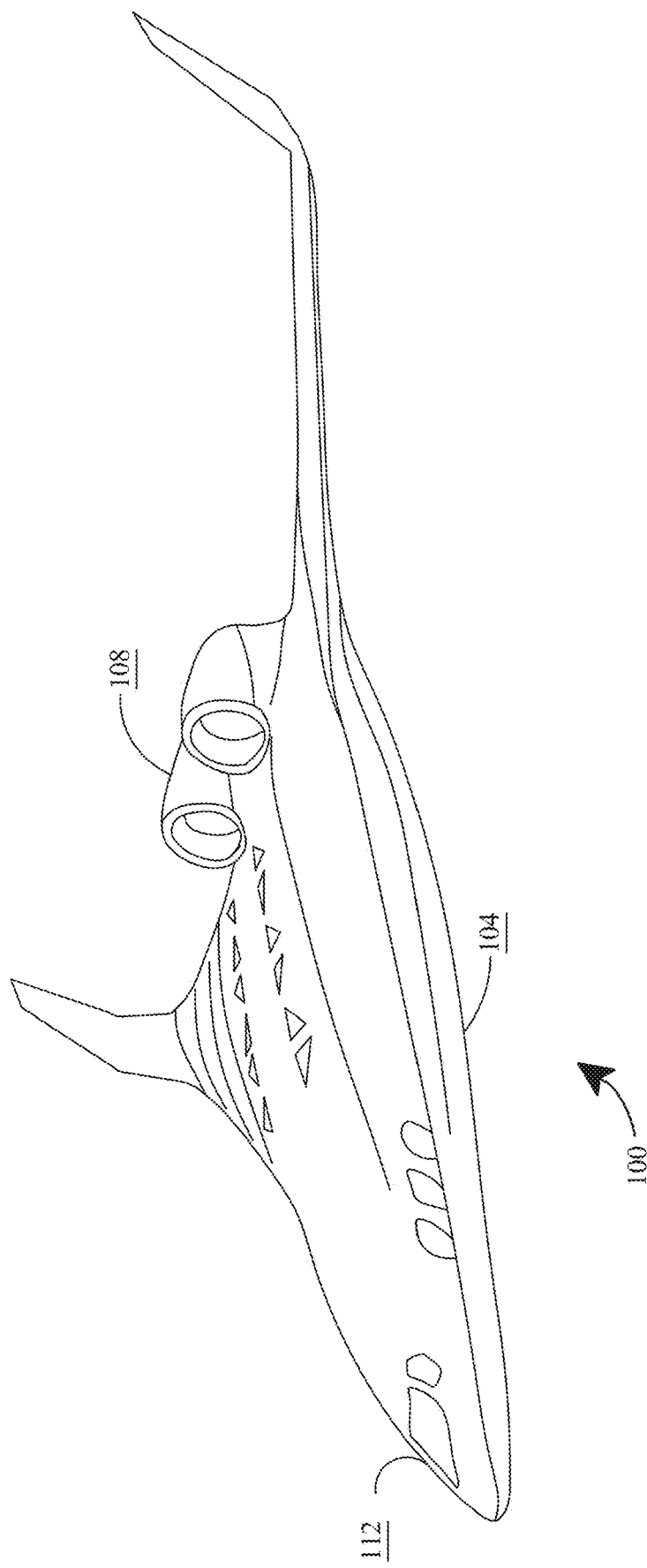
FIG. 1 is a schematic of an exemplary blended wing aircraft.

Referring now to FIG. 1, an exemplary embodiment of an aircraft 100 with multi-walled fuel tanks is illustrated. Aircraft 100 includes a blended wing body 104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1, BWB 104 of aircraft 100 may include a nose portion. A "nose portion," for the purposes of this disclosure, refers to any portion of aircraft 100 forward of the aircraft's fuselage 116. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contain an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 1, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 1, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion of a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1, aircraft 100 may include at least a flight component 108. A flight component 108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 100. In some embodiments, at least a flight component 108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 1, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1, at least a flight component may be one or more devices configured to affect aircraft's 100 attitude. "Attitude," for the purposes of this disclosure, is the relative orientation of a body, in this case aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum," for the purposes of this disclosure, refers to at least an element of data identifying an attitude of an aircraft 100.

With continued reference to FIG. 1, in some cases, aircraft 100 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 1, in some cases, aircraft 100 may include at least a pilot control. As used in this disclosure, a "pilot control," is an interface device that allows an operator, human or machine, to control a flight component of an aircraft. Pilot control may be communicatively connected to any other component presented in aircraft 100, the communicative connection may include redundant connections configured to safeguard against single-point failure. In some cases, a plurality of attitude datums may indicate a pilot's instruction to change heading and/or trim of an aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 100. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components, or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 108. At least a flight component 108 may include any propulsor as described herein. In embodiment, at least a flight component 108 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 1, at least a sensor may include a gas sensor. Gas sensor may detect gas that may be emitted through the energy source such as a fuel tank and/or battery. Gaseous discharge may include oxygen, hydrogen, carbon dioxide, methane, carbon monoxide, a combination thereof, or another undisclosed gas, alone or in combination. Further the sensor configured to detect vent gas from fuel tanks and/or other energy sources may comprise a gas detector. For the purposes of this disclosure, a "gas detector" is a device used to detect a gas is present in an area. Gas detectors, and more specifically, the gas sensor that may be used in sensing system, as discussed in FIG. 2, may be configured to detect combustible, flammable, toxic, oxygen depleted, a combination thereof, or another type of gas alone or in combination. The gas sensor that may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor may also be configured to detect non-gaseous byproducts from battery cell failure and/or fuel tanks including, in non-limiting examples, liquid chemical leaks including aqueous alkaline solution, ionomer, molten phosphoric acid, liquid electrolytes with redox shuttle and ionomer, and salt water, among others.

With continued reference to FIG. 1, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, at least a flight component 108 may include wings, empennages, nacelles, control surfaces, fuselages, and landing gear, among others, to name a few. In embodiments, an empennage may be disposed at the aftmost point of an aircraft body 104. Empennage may comprise a tail of aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exists from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often based upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing, and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion 112 of blended wing body 108. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 1, modular aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 1, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1, aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1, aircraft 100 may include multiple flight component 108 sub-systems, each of which may have a separate energy source. For instance, and without limitation, one or more flight components 108 may have a dedicated energy source. Alternatively, or additionally, a plurality of energy sources may each provide power to two or more flight components 108, such as, without limitation, a "fore" energy source providing power to flight components located toward a front of an aircraft 100, while an "aft" energy source provides power to flight components located toward a rear of the aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 108. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1, aircraft 100 may include a flight component 108 that includes at least a nacelle 108. For the purposes of this disclosure, a "nacelle"

is a streamlined body housing, which is sized according to that which is houses, such as without limitation an engine, a fuel store, or a flight component. When attached by a pylon entirely outside an airframe 104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 100 partially or wholly enveloped by an outer mold line of the aircraft 100. At least a nacelle may be designed to be streamlined. At least a nacelle may be asymmetrical about a plane comprising the longitudinal axis of the engine and the yaw axis of modular aircraft 100.

With continued reference to FIG. 1, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1, in nonlimiting embodiments, at least a flight component 108 may include an airbreathing engine such as a jet engine, turbojet engine, turboshaft engine, ramjet engine, scramjet engine, hybrid propulsion system, turbofan engine, or the like. At least a flight component 108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include turbofans. Alternatively and/or additionally, jet engine may include a turbojet. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1, an aircraft 100 may include a flight controller. As used in this disclosure, a "flight controller" is a device that generates signals for controlling at least a flight component 108 of an aircraft 100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of aircraft 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, a propulsor of aircraft 100 may comprise a combustion engine. Combustion engine is configured to burn the fuel from the fuel source to produce mechanical work. Resulting mechanical work may be used to power the propulsor. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that includes a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include turbofans. Alternatively and/or additionally, jet engine may include a turbojet. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element. Additionally, at least an electric motor of the propulsor may be operatively connected with a fuel cell by way of electrical communication, for example through one or more conductors.

Still referring to FIG. 1, aircraft 100 may comprise at least an auxiliary power unit powered by the fuel and mechanically affixed to the aircraft. As used in this disclosure, an "auxiliary power unit" is a power system, such as without limitation an electrical circuit or mechanical power source, that provides electrical energy to non-propulsor flight components of an aircraft. Exemplary non-limiting non-propulsor flight component include an avionic system, a flight control system, an environmental control system, and anti-ice system, a lighting system, a fuel system, a braking system, and/or a landing gear system.

Referring now to FIG. 2A, an exemplary embodiment of a fuel tank 200 (also referred to as a "tank") is shown. In this disclosure, a "fuel tank" is a container of fuel, which is often flammable. In an embodiment, a fuel tank 200 stores fuel to power aircraft 100. A fuel tank 200 may be permanently attached to aircraft 100. As used in this disclosure, a tank may be "permanently attached" when it is configured to not be removed during ordinary use. For example, a tank permanently attached to aircraft may be removed during maintenance or overhaul but is otherwise a permanent flight component of the aircraft. A fuel tank 200 of a plurality of fuel tanks may include one or more compartments to store fuel in. Tank 200 may be configured to store a liquified gas fuel. As used in this disclosure, a "liquified gas fuel" is a fuel that at standard atmospheric conditions or when utilized (e.g., combusted) is gas and is stored as a fuel. Liquified gas fuels include without limitation liquid hydrogen, propane, and liquified natural gas. A fuel tank 200 of a plurality of fuel tanks may be a part of fuel delivery system for an engine, in which the fuel may be stored inside a fuel tank and then propelled or released into an engine, such as without limitation a combustion engine. Tank 200 may be a pressure vessel. A "pressure vessel" is a container configured to hold fluids at a pressure that may differ from an ambient pressure. Pressure vessel may be configured to be pressurized in order to allow flow of gaseous fuel from a tank 200, for example without a need to pump. In an embodiment, but without limitation, a tank 200 may act as a pressure vessel to store the fuel at a high pressures above 5 psig, 15 psig, 50 psig, or the like. A tank 200 may be made of any material able to withstand such high pressure, such as but without limitation, aluminum, steel, titanium, carbon fiber, composite materials, or the like. Furthermore, a tank 200 may further include an inner tank and an outer wall. As used herein, an "inner wall" is the inner barrier of a tank that is in contact with the fuel. As used herein, an "outer wall" is the outer barrier of a tank that is in contact with an environment outside the tank. There may be insulation between the outer and inner wall. A tank 200 may also include safety valves, closures, vessel threads, or any other features that can be found on fuel tanks.

Still referring to FIG. 2A, in some embodiments, at least a fuel tank may be located in a transitional portion of blended wing body. In some embodiments, at least a fuel tank may be located in a main body portion of blended wing body. In some embodiments, at least a fuel tank may be located in a wing portion of blended wing body. In some embodiments, at least a fuel tank may be located in longitudinal center of blended wing body.

Now referencing FIG. 2B, a cross sectional view 202 of fuel tank 200. Tank 200 includes an inner wall 204. Inner wall 204 may be in direct contact with the fuel in the fuel tank 200. Inner wall 204 may be configured to hold the fuel. Inner wall 204 may also be direct or indirect contact with an interstitial volume 208 found between the inner wall 204 and the outer wall 212. As used herein, an "interstitial volume" is an intervening space between two barriers. Barriers may include the outer and inner wall. Inner wall 204 may be made from carbon polymer composite (carbon epoxy), aluminum, composite, or the like, or a combination thereof. In an embodiment, inner wall 204 may include an aluminum liner in combination with the carbon epoxy material. Carbon epoxy may be used over aluminum as it is lighter and has a lower thermal expansion coefficient as compared to aluminum. However, carbon epoxy may leak more than aluminum. Thermal expansion coefficient may be an important factor in the inner wall material as exposure to low-temperature (e.g., −252.87° C. at 1.013 bar of pressure) liquified gas fuel in the fuel tank 200 causes the inner wall 204 to contract. Aluminum may substantially vary in size when exposed to the variations in temperature of a typical liquified gas fuel tank. The coefficient of thermal expansion (α) of aluminum is approximately $23 \times 10^{6 \circ}$ C.$^{-1}$. Change in length (L) for a given piece of aluminum subjected to a temperature increase is determined by the following equation, wherein t is the temperature increase.

$$\Delta L = \alpha L t$$

The contraction of the inner wall 204 may cause pressure, such as without limitation ununiform pressures, on the outer wall 212 or the interstitial volume 208.

Continuing to reference FIG. 2B, tank 200 may include a sensing system connected to a controller to monitor and control leakage from the tank. Sensing system is described with respect to FIG. 3. As discussed above, inner wall 204 may leak gaseous fuel (e.g., gaseous hydrogen). Outer wall 212 may contain the leakage such that the gaseous fuel does not escape the tank 200. However, leaked gaseous fuel may need to be purged from the interstitial volume 208 to maintain a gaseous fuel concertation (e.g., hydrogen concentration) below that which supports combustion. In some cases, tank 200 may be configured to prevent hydrogen volumetric concentration from exceeding 4% within interstitial volume. Above this threshold value, in some cases, the hydrogen may become combustible when mixed with oxygen in the air. In some embodiments, a threshold for purging hydrogen may be set lower than 4%, for instance 1%, 0.1%, or 0.01% to account for a margin of safety. In an embodiment, sensing system may purge interstitial volume to keep hydrogen gas at or below 1%, 0.1%, or 0.01% hydrogen volumetric concentration of the interstitial volume 208.

Purged gaseous fuel may be released overboard. Sensing system may include a gas sensor, as discussed in FIG. 1, that may detect gaseous fuel in the interstitial volume. Gas sensor may measure gaseous fuel concentration (e.g., hydrogen concentration) in the interstitial volume. A gas sensor may include optical fiber surface plasmon resonance (SPR) sensors. As non-limiting examples, SPR sensors may include fiber bragg gratings coated with a palladium layer, a micromirror, or a tapered wire coated with palladium. Gas sensor may also include electrochemical hydrogen sensors, microelectromechanical system (MEMS) hydrogen sensors, thin film sensors, thick film sensors, chemochromic hydrogen sensors, diode based Schottky sensors, or the like. Alternatively or additionally, gas sensor may be configured to monitor purge flow rate. "Purge flow rate," as used in this disclosure, is the rate that of gas being vented out. Purge flow rate may be measured in mass flow rate, pressure (e.g., pressure difference), volumetric flow rate, gas velocity, or the like. Purge flow rate may be monitored using a velocity sensor physically or communicatively connected to the gas sensor. Purge flow rate may be measured using one or more pressure sensors. Purge flow rate may be measured using a pitot tube. Purge flow rate may be monitored at a vent. Purge flow rate may be used to identify excessive gas leakage, which may help avoid sudden failure. Sensing system may include a vent 216 attached to tank 200. As used in this disclosure, a "vent" is an opening and/or aperture configured to allow one or more fluids to pass. In some embodiments, BWB aircraft may include a vent fluidly connected to the interstitial volume and configured to vent gas from the interstitial volume at a purge flow rate sufficient to maintain a fuel gas concentration within the interstitial volume below a threshold gas concentration. Gas sensor may be communicatively connected to a controller that may control a vent 216 to ventilate the interstitial volume 208 of gaseous discharge. In an embodiment, controller may signal the vent to switch from a closed position to an open position when a threshold gas concentration value is detected. Threshold gas concentration value may be 1%, 0.1%, or 0.01% hydrogen volumetric concentration of the interstitial volume 208. In some embodiments, threshold gas concentration may be below a level needed for combustion. In some embodiments, threshold gas concentration may be 3%, 4%, 5% or greater. In some cases, vent 216 may include a check valve. A check valve may be used to prevent backflow of gases. As used in this disclosure, a "check valve" is a valve that permits flow of a fluid only in certain (e.g., one) directions. In some cases, check valve may be configured to allow flow of fluids substantially only away from tank 200 while preventing back flow of vented fluid to tank 200. Vent may also include a pressure regulator. A "pressure regulator" is a type of valve that controls the pressure of a fluid. Venting gaseous fuel from tank 200 prevents over-pressurizing or other events that may cause catastrophic damage or harm. It may also be desirable, when aircraft 100 is grounded, to connect a system of lines and tanks to the vent to collect the boiled-off fuel. In some cases, the collected gaseous fuel can be compressed by a pump into storage tanks and then cooled to liquid temperatures for reuse as aircraft fuel. In some cases, vent 216 may be configured to prevent condensation resulting from venting of gas. For instance and without limitation, vent 216 may include insulation, cascading pressure vessels, gradual throttling valves, clean dry air mixing, and the like to prevent one or more of gas expansion, temperature drop, and/or condensation.

Continuing to reference FIG. 2B, tank 200 may include a gap 220. Gap 220 may be in the interstitial volume 208. As used herein, "gap" refers to the portion of the interstitial volume that is not taken up by a structure, such as insulation. In some cases, gap 220 may be configured to resist conductive and/or convective heat transfer, for instance between inner and outer walls of tank 200. The gap may be ventilated. In an embodiment, gap may be connected to the vent 216 such that the vent may ventilate fuel gas out of the gap 220. The gap may allow the gaseous fuel that leaks from the inner wall 204 to be purged from the tank 200. Gap may be located between the outside face of the inner wall 204 and insulation. In some cases, vented gas from the gap 220 may be vented overboard outside of aircraft. Alternatively or additionally, in some cases, vented gases from the gap 220 may be vented into cabin (and then vented using cabin ventilation systems). In some cases, purge gas may be pumped into gap 220. Purge gas may include air, nitrogen, recirculated gas, or the like. In some cases, purge gas may be filtered and/or dried prior to pumping into gap 220, for example to prevent condensation and/or contamination of an inner or outer tank wall which could lead to decreased insulation.

Figure 2:
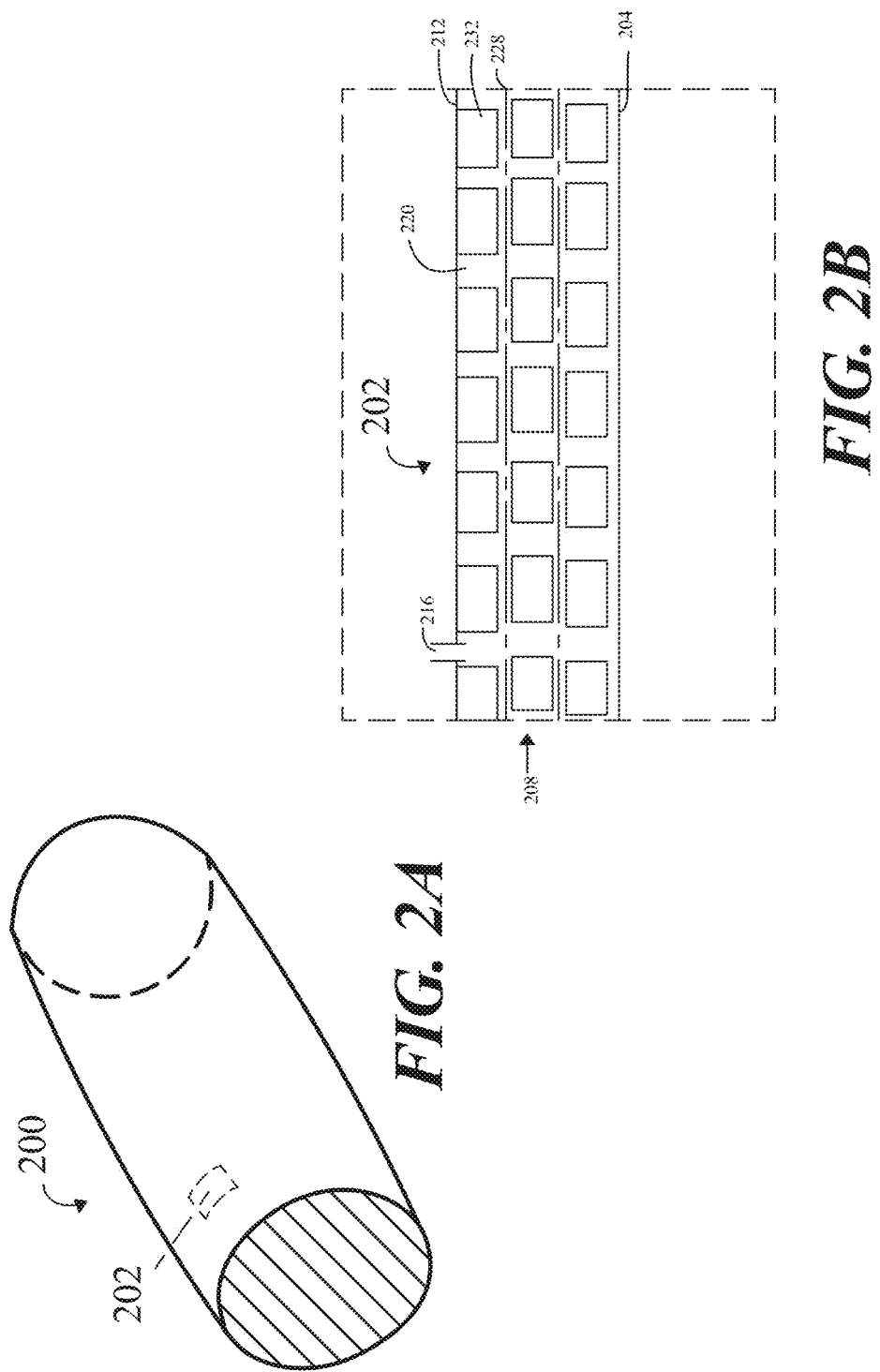
FIG. 2A is an exemplary depiction of a fuel tank.
FIG. 2B is an exemplary depiction of a cross section of a fuel tank.

Continuing to reference FIG. 2B, tank 200 includes at least a reflective film layer and at least a structural insulation layer. At least a reflective film layer and at least a structural insulation layer may form insulation for the tank 200. As used herein, "reflective film" is a thin layer of reflective material that lowers heat transfer. Reflective film layer may be a coating, for instance on a surface of inner and/or outer wall of a tank. Reflective film layer may include, without limitation, gold, nickel, silver, or the like. Reflective film layer may be a coating on the inner or outer wall. Reflective film layer may include a high polish surface on one or more of inner or outer walls. A high polish surface may have a Ra value less than 10 microns, less than 1 micron, or less than 0.5 microns. In some cases, reflective film layer may be configured to limit radiative heat transfer, for example from inner wall to outer wall. Interstitial volume 208 may include several layers of reflective film 228 and structural insulation 232. Reflective film 228 may be sandwiched in between layers of structural insulation 232 as shown in FIG. 2. In an embodiment, there may be 5 layers of insulation, wherein a "layer of insulation" is defined as a combination of one layer of reflective film and one layer of structural insulation. The number of layers of insulation may be determined by the thermal resistance requirement of the interstitial volume 208. Thermal resistance is a property of the material's thermal conductivity, thickness, and area.

Continuing to reference FIG. 2B, at least a reflective film layer may be used in the insulation. Reflective film 228 may include a metal sheet, for example a sheet of an aluminum alloy, silver, gold, titanium, stainless steel, or the like. Reflective film 228 may include a metalized plastic film. Plastic film may include Mylar, Kapton, or Tedlar. Reflective film 228 may use nickel, aluminum, gold, silver, a combination thereof, or other metals. Reflective film 228 may use polyimide or polyester, or the like. Reflective film 228 may reduce heat transfer from radiation due to the reflective nature. Reflective film 228 may be a multi-layer insulation (MLI). Persons skilled in the art, upon reviewing the entirety of this disclosure, will be aware of various materials used in reflective films. Reflective film 228 may be used in combination with a structural insulation 232 to decrease heat transfer between the inner wall 204 and the outer wall 208. Insulation may be used to prevent air or water from freezing on the outer surface of the inner wall 204.

Still referencing FIG. 2B, insulation may also include at least a structural insulation layer. There may be a plurality of structural insulation layers, wherein the reflective film 228 is in between each layer of structural insulation 232. "Structural insulation," as used herein, is a form of self-supporting insulation within the interstitial volume. In some cases, structural insulation may support other insulation layers (e.g., reflective film layer) within the interstitial volume. Structural insulation 232 may, in some cases, support the outer wall 212 against the vacuum in the interstitial volume 208, for example by providing compressive forces between inner and outer walls. Vacuum may be used to evacuate volume between the inner wall 204 and the outer wall 212. Vacuum may also be result of a pressure differential (i.e., higher pressure outside of outer wall than in interstitial volume). Additionally, structural insulation 232 may support the inner wall 204 against the high pressure from the liquified gas fuel. Structural insulation 232 may be divided into blocks such that the structural insulation 232 is discontinuous. Gaps between the structural insulation 232 may provide gaps to allow evacuation and leak detection. Gaps between structural insulation 232 may provide fluidic pathways for gaseous discharge. Structural insulation 232 may be composed from a porous or non-porous insulation. Structural insulation 232 may be composed of, as non-limiting examples, Aerogel, vermiculite, fiberglass, X-Aerogel, crosslinked Aerogel, firebrick, or any other insulation with a low thermal conductivity coefficient. A low thermal conductivity may be any thermal conductivity less than 0.10, 0.01, or 0.001 W/m-k. Structural insulation 232 may limit heat transfer by conduction.

Still referencing FIG. 2B, tank 200 includes an outer wall 212. Outer wall 212 may be in between an outside environment (e.g., aircraft cabin environment) and interstitial volume 208. Outer wall 212 may be offset from the inner wall 204 such that the interstitial volume 208 is in between. Outer wall 212 may provide damage protection from external elements such as temperature, transportation, or the like that may occur within the aircraft. Tank 200 may be stored within the aircraft 100. In some embodiments, tank 200 may be stored within the outer mold line (skin) of the aircraft body (such as blended wing body 104). Alternatively, tank 200 may be mounted outside the aircraft within a nacelle. Outer wall 212 may prevent permeation of gases originating from within inner wall 204 and/or interstitial volume 208. Outer wall 212 may be composed of one or more of steel and aluminum to prevent the permeation of gases from the inner wall 204 of the tank 200. Outer wall 212 may also be composed of other materials, such as composites, carbon polymer composites, titanium, and the like. Outer wall 212 may be composed of materials that are able to withstand the compression loads from a pressure differential between in the interstitial volume 208 and an environment outside the outer wall. In an embodiment, outer wall 212 may be subjected to compression loads because the outer wall 212 may shrink due to the vacuum in the interstitial volume. In some embodiments, outer wall 212 may be corrugated so that the outer wall 212 may accept changes in its diameter with flexure. In an embodiment, corrugated outer wall 212 may minimize thickness of the outer wall 212 because a corrugated outer wall may be stronger against compression loads than a non-corrugated outer wall, therefore less material is needed for a corrugated outer wall. In some embodiments, outer wall 212 may include a corrugated piece of material sandwiched between two non-corrugated pieces of material. The non-corrugated pieces of material may provide additional strength and insulation to the outer wall 212 and increase the durability of it.

Blended wing aircrafts may be consistent with any blended wing aircraft and fuel tank as disclosed in U.S. patent application Ser. No. 17/731,622 entitled "BLENDED WING BODY AIRCRAFT WITH A COMBUSTION ENGINE AND METHOD OF USE" and filed on Apr. 28, 2022, which is incorporated by reference in its entirety. Permanent tanks may be consistent with any permanent tank as disclosed U.S. patent application Ser. No. 17/731,655 entitled "SYSTEMS AND METHODS FOR A BLENDED WING BODY AIRCRAFT WITH PERMANENT TANKS" and filed on Apr. 28, 2022, which is incorporated by reference in its entirety. Fuel tanks may be consistent with any fuel tank as disclosed in U.S. patent application Ser. No. 17/731,728 entitled "AN AIRCRAFT WITH FUEL TANKS STORED AFT OF A CABIN IN A MAIN BODY AND A METHOD FOR MANUFACTURING" and filed on Apr. 28, 2022, which is incorporated by reference in its entirety. Aircraft may use fuel cells consistent with any fuel cells as disclosed in U.S. patent application Ser. No. 17/478,724 entitled "BLENDED WING BODY AIRCRAFT WITH A FUEL CELL AND METHOD OF USE" and filed on Sep. 17, 2021, which is incorporated by reference in its entirety.

Fuel tanks may be consistent with fuel tanks disclosed in U.S. patent application Ser. No. 17/731,622 entitled "BLENDED WING BODY AIRCRAFT WITH A COMBUSTION ENGINE AND METHOD OF USE" and filed on Apr. 28, 2022, U.S. patent application Ser. No. 17/841,153 entitled "A METHOD FOR FUELING AN AIRCRAFT" and filed on Jun. 15, 2022, U.S. patent application Ser. No. 17/731,655 entitled "SYSTEMS AND METHODS FOR A BLENDED WING BODY AIRCRAFT WITH PERMANENT TANKS" and filed on Apr. 28, 2022, U.S. patent application Ser. No. 17/731,728 entitled "AN AIRCRAFT WITH FUEL TANKS STORED AFT OF A CABIN IN A MAIN BODY AND A METHOD FOR MANUFACTURING" and filed on Apr. 28, 2022, U.S. patent application Ser. No. 18/105,438 entitled "SYSTEMS AND METHODS FOR A LIQUIFIED GAS FUEL TANK INCORPORATED INTO AN AIRCRAFT" and filed on Feb. 3, 2023, U.S. patent application Ser. No. 17/867,851 entitled "METHODS AND SYSTEMS FOR VENTING A FUEL TANK ON A BLENDED WING BODY AIRCRAFT" and filed on Jul. 19, 2022, and/or U.S. patent application Ser. No. 17/731,685 entitled "AN AIRCRAFT FUELING APPARATUS AND A METHOD FOR ITS USE" and filed on Apr. 28, 2022, each of which is incorporated by reference in its entirety.

Figure 3:
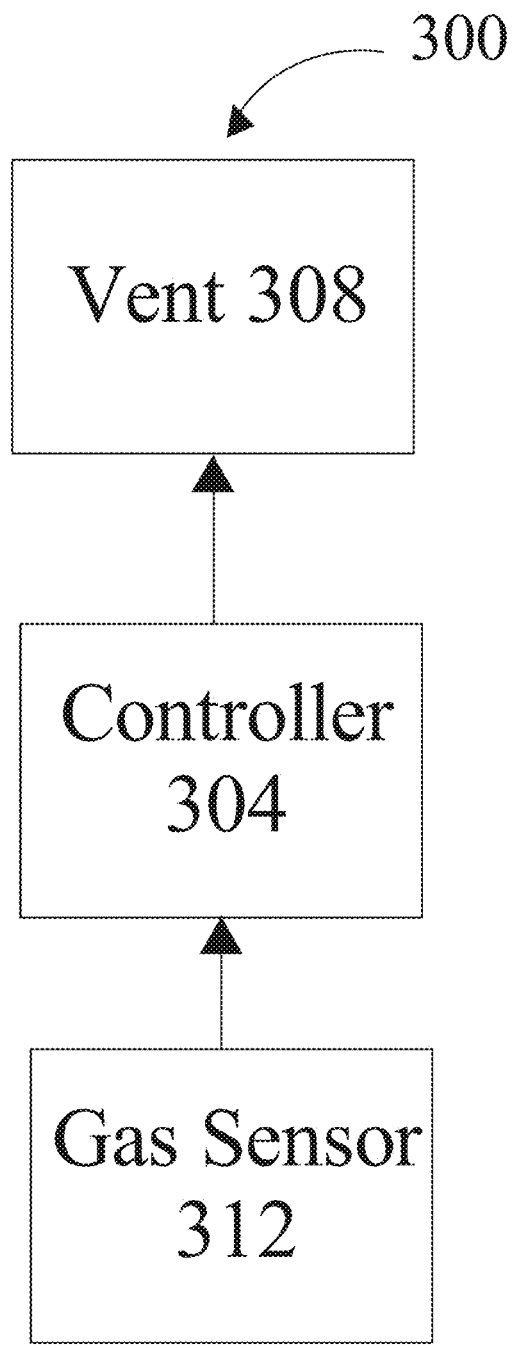
FIG. 3 is a block diagram of a sensing system.

Now referring to FIG. 3, a block diagram of a sensing system 300 for aircraft 100. Sensing system may include a controller 304. Controller 304 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 304 may include a single computing device operating independently, or may include two or more computing device operating in concert, in parallel, sequentially or the like; two or more computing devices may be included together in a single computing device or in two or more computing devices. Controller 304 may interface or communicate with one or more additional devices as described below in further detail via a network interface device. Network interface device may be utilized for connecting controller 304 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 304 may include but is not limited to, for example, a computing device or cluster of computing devices in a first location and a second computing device or cluster of computing devices in a second location. controller 304 may include one or more computing devices dedicated to data storage, security, distribution of traffic for load balancing, and the like. controller 304 may distribute one or more computing tasks as described below across a plurality of computing devices of computing device, which may operate in parallel, in series, redundantly, or in any other manner used for distribution of tasks or memory between computing devices. controller 304 may be implemented using a "shared nothing" architecture in which data is cached at the worker, in an embodiment, this may enable scalability of aircraft 100 and/or computing device.

With continued reference to FIG. 3, controller 304 may be designed and/or configured to perform any method, method step, or sequence of method steps in any embodiment described in this disclosure, in any order and with any degree of repetition. For instance, controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 304 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 3, controller 304 may be connected to a gas sensor 308. Gas sensor 308 and controller 304 may be communicatively connected. Gas sensor 308 may be consistent with any gas sensor disclosed as part of this disclosure. Controller may be consistent with any controller disclosed as part of this disclosure. Gas sensor 308 may detect gas concentrations such as gaseous fuel concentrations. Gas sensor may monitor purge flow rate by monitoring the velocity of gas leaving vent 312. Velocity, mass flow rate, or the like may be measured using a pressure sensor or velocity sensor communicatively connected or physically connected to the gas sensor 308. Vent may be consistent with any vent as discussed above, Gas sensor 308 may be consistent with any gas sensor as described above. Gas sensor 308 may cause the controller 304 to issue signals to a vent 312, such as a purge valve or pump. For example, the signals may cause the vent 312 to open if the gaseous fuel concentration exceeds a threshold value, such as the threshold values discussed above. In another example, gas sensor 308 may send a signal that causes the vent 312 to open if the gas sensor 308 detects excessive gas leakage, which may help avoid sudden failure of the tank.

Continuing with reference to FIG. 3, in some embodiments controller 304 may control gaseous fuel (i.e., fuel vapor) concentration. For example, in some cases, gaseous fuel concentration within an interstitial volume (i.e., gap 220) between an inner wall and an outer wall may be controlled. In some embodiments, gaseous fuel concentration may be adjusted by controlled admission of air or other gases into gap 220. In some cases, admission of air or other gases may be controlled by vent 308. Vent 308 may be configured to allow admission of air or other gases (e.g., nitrogen) into gap 220. In some cases, air may come from within aircraft cabin and/or from outside of aircraft. In some cases, other gases may help prevent combustion of gaseous fuel. For instance, if interstitial volume 220 is filled with a mixture of nitrogen and fuel vapor, combustion is not possible due to absence of oxygen. In some cases, using administrating an inert gas into interstitial volume 220 may be favorable because greater concentrations of fuel vapor may be permitted. In some cases, nitrogen may be supplied by an onboard inert gas generator system. In some cases, an onboard inert gas generator system may be in place to reduce flammability of fuel vapor, generally. In some embodiments, gas admission rate may be controlled in concert with interstitial volume pressure to result in a combination of desired pressure and fuel vapor concentration. For instance in some embodiments, controller 304 may control pressure within the interstitial volume 220. Generally lower gas pressure within interstitial volume 220 will increase thermal insulation. In some cases, interstitial volume pressure may be controlled by way of pump rate (e.g., vacuum pump rate).

Figure 4:
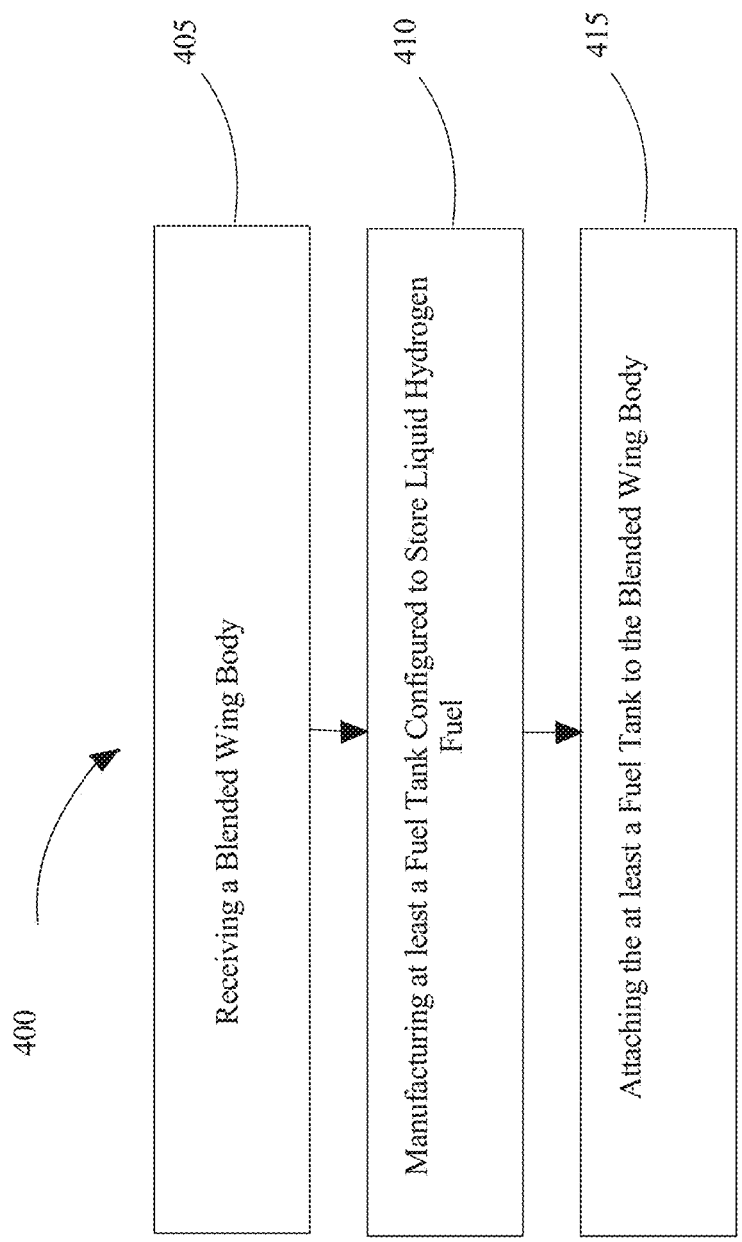
FIG. 4 is a flow diagram of a method for manufacturing a multi-walled fuel tank.

Now referring to FIG. 4, a method of manufacturing 400 for a multi-walled fuel tank for an aircraft 100 is shown. Step 405 of method 400 includes receiving a blended wing body. Blended wing body may be consistent with any blended wing body as discussed herein and in reference to FIG. 1. Step 410 of method 400 includes manufacturing at least a fuel tank configured to store liquified gas fuel. Fuel tank may contain liquified gas fuel. Manufacturing a fuel tank includes receiving an inner wall. Inner wall may include an aluminum liner to help prevent the permeation of gases. Inner wall may be consistent with any inner wall as discussed herein and with reference to FIG. 2B. Manufacturing a fuel tank also includes receiving an outer wall. Outer wall may be offset from the inner wall. The offset space may include an interstitial volume. Outer wall may be corrugated to increase the strength of the wall and decrease the thickness of the wall. Outer wall may be configured to change sizes due to the evacuation of the interstitial volume. The vacuum may put compression loads on the outer wall causing the outer wall to shrink. Outer wall may be consistent with any outer wall as discussed herein, and with reference to FIG. 2.

Continuing to reference FIG. 4, manufacturing a fuel tank also includes forming an interstitial volume including at least a reflective film layer and at least a structural insulation layer between the inner wall and the outer wall. Interstitial volume may include a gap to allow leaked gases to be purged. Gap may be found between the blocks of structural insulation as shown in FIG. 2B. Insulation may include layers of reflective film sandwiched in between structural insulation that is divided into blocks. Reflective film layer may include a metalized plastic film. In an embodiment, the metal in the reflective film layer may include aluminum, copper, or the like. Structural insulation may include aerogel. Interstitial volume may be evacuated to form a vacuum. Interstitial volume may be evacuated to an absolute pressure of 0 to 5 PSI. In an embodiment, interstitial volume may be evacuated through the use of a vacuum pump. Vacuum pump may be connected to the interstitial volume through a vent such as a valve. Structural insulation, gap, metalized plastic film, and interstitial volume may be consistent with any structural insulation, gap, metalized plastic film, and interstitial volume, respectively, as disclosed herein.

Step 415 of method 400 includes attaching the at least a fuel tank to the blended wing body. Fuel tank and blended wing body may be constructed separately, then fuel tank may be independently mounted within. "Independently mounted," as used herein, means mounted separately from the structure of the aircraft or other elements within the aircraft. Plurality of fuel tanks may be integrated within a structure of the blended wing body. For example, fuel tanks may be mounted such that the fuel tanks may support the airframe of the aircraft. This may entail mechanically connecting the fuel tanks to the airframe. This integration of the fuel tanks makes the fuel tanks permanently attached as removing the fuel tanks may damage the airframe of the aircraft. Integration within the structure may make the fuel tanks and the aircraft mutually dependent. Fuel tanks may be mounted with rigid mounts, or linked mounts, or the like.

Figure 5:
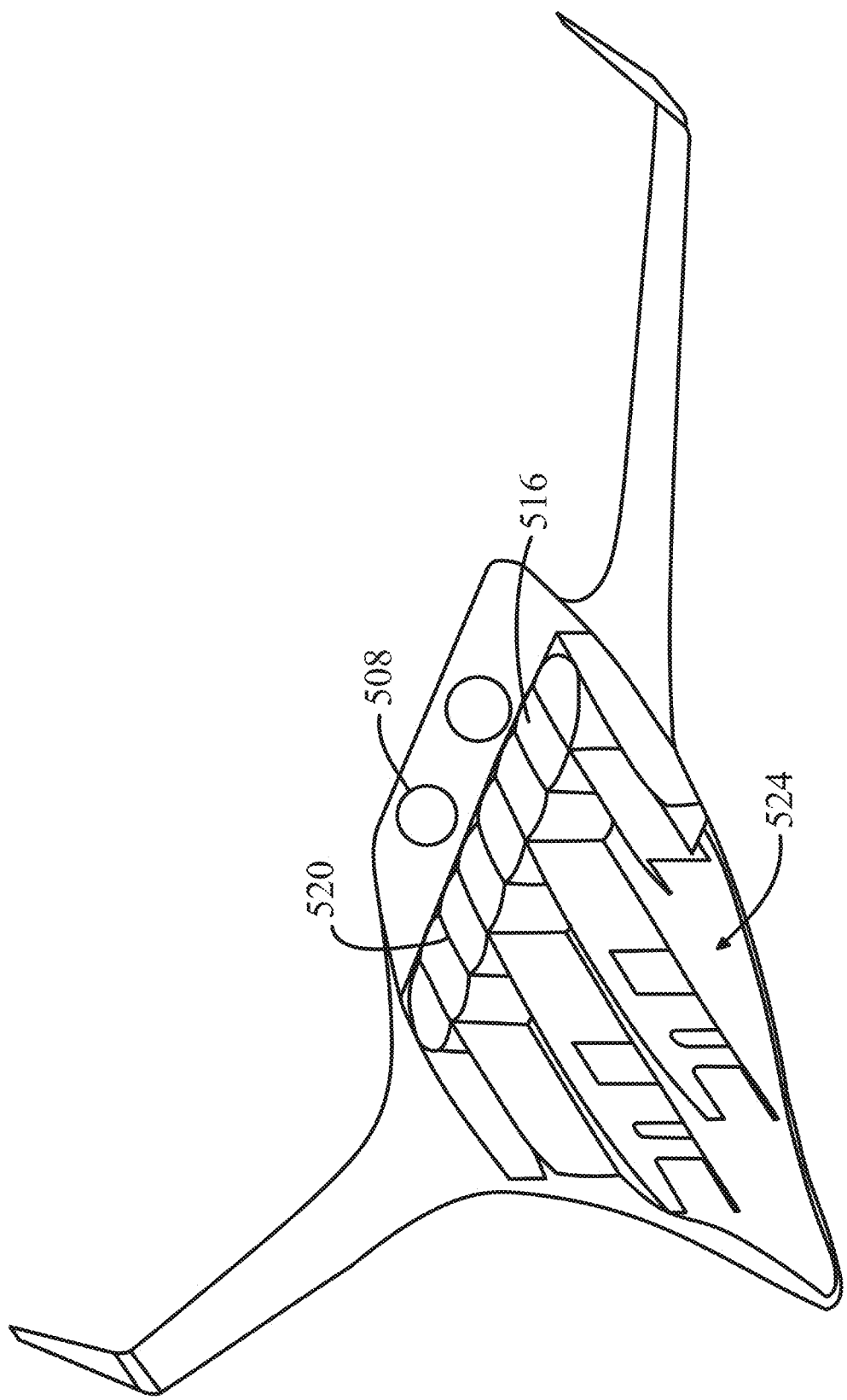
FIG. 5 is a block diagram for an exemplary embodiment of a blended wing body aircraft with permanent tanks.

Now referring to FIG. 5, a depiction of an exemplary embodiment of the interior of an aircraft 100 with fuel tanks stored aft of a cabin 524 in the main body is shown. Aircraft 100 may include a plurality of fuel tanks. In an embodiment, a fuel tank 516 stores fuel to power aircraft 100. A fuel tank 516 may be permanently attached to aircraft 100 as described with reference to FIG. 2. For example, a tank permanently attached to aircraft may be removed during maintenance or overhaul but is otherwise a permanent flight component of the aircraft. Fuel tank 516 of a plurality of fuel tanks may include one or more compartments to store fuel in. Fuel tank 516 of a plurality of fuel tanks may be a part of fuel delivery system for an engine, in which the fuel may be stored inside a fuel tank and then propelled or released into an engine, such as without limitation a combustion engine. Tank 516 may include a pressure vessel as described with reference to FIG. 2. Pressure vessel may be configured to be pressurized in order to allow flow of gaseous fuel (e.g., hydrogen, propane, or natural gas) from tank 516, for example without a need to pump. In an embodiment, but without limitation, tank 516 may act as a pressure vessel to store the fuel at a high pressures above 5 psig, 15 psig, 50 psig, or the like. Tank 516 may be made of any material able to withstand such high pressure, such as but without limitation, aluminum, carbon fiber, composite materials, or the like. Furthermore, tank 516 may further include an inner wall and an outer wall as described with reference to FIG. 2. There may be insulation between the outer and inner wall. Tank 516 may also include safety valves, closures, vessel threads, or any other features that can be found on fuel tanks. Tank 516 may further have a tank geometry as described with reference to FIG. 2. Tank 516 may have a multi-lobe geometry, such that the multi-lobe geometry includes one or more curvatures. As used herein, "multi-lobe geometry" refers to a shape that includes multiple curvatures or "lobes." A "lobe" as used herein, is a curved section of the multi-lobe geometry. Multi-lobe geometry may have multiple lobes, wherein the start of one lobe is marked by a discontinuation in the curvature. A discontinuation in the curvature may occur when the curvature of a tank switches between two non-adjacent values instantaneously or substantially instantaneously. The curvature of the tank may switch substantially instantaneously when there is a weld or other fastener or a division such as a septum. In other embodiments, curvature may switch substantially instantaneously, when, for example, two lobes of a tank meet, but the intersection has been rounded or otherwise altered in order to, among other things, reduce stress concentrations at the intersection point. For example, tank 516 may have one or more surfaces with spherical and/or cylindrical shapes. Each lobe of the multi-lobe tank geometry may be configured to have a different radius. Tank 516 may include variable diameter and length. A lobe may include a single sphere or cylinder of the plurality of spheres and/or cylinders. According to some embodiments, tank geometry for a blended wing body aircraft 104 may be driven by at least five objectives: (1) to provide as much fuel volume as possible while using little payload floor space, (2) to provide a fuel tank shape that resists pressure and that is lightweight, (3) to provide a fuel tank shape that can be insulated between outer wall and inner wall, (4) to provide a fuel center of gravity that is not widely misaligned with the aircraft's center of gravity, and (5) to provide fuel tanks that are compatible with a passenger cabin. In this disclosure, a "fuel center of gravity" is the center of gravity of the fuel inside a tank. In some cases, fuel center of gravity may affect overall aircraft center of gravity. Fuel center of gravity may be associated with a volume within airplane that has sufficient volume to store a practical quantity of fuel in discrete tanks. Tank 516 may be arranged inside blended wing body 104 as a function of its fuel center of gravity in relation to center of gravity of aircraft 100.

With continued reference to FIG. 5, blended wing body 104 may include tank 516, where tank 516 is configured to store liquified gas fuel and may include at least a vent and insulation. Liquified gas fuels include without limitation liquid hydrogen, propane, and liquified natural gas. Tank 516 may include a permanent tank. As used herein, a "permanent tank" is a tank that is permanently attached to an aircraft. A permanent tank may be added to an existing aircraft or attached during the aircraft's construction. In either case, the intention of a permanent tank may be to leave tank 516 in place for an extended period. A permanent tank may integrate tank 516 and BWB 104 structure so that the BWB 104 supports tank 516, and/or tank 516 supports BWB 104. As a non-limiting example, tank 516 may support BWB 104 by assisting the airframe of the BWB 104 in resisting pressurization and carrying shear that would otherwise be carried by the ribs of the BWB 104. In some embodiments, curved surfaces of tank 516 may not be well suited to assisting structural surfaces of BWB 104. However, in some embodiments, septa 520 of multi-lobe tanks may be well-suited to support the structure of aircraft 100. As used herein, "septa" are partitions between objects, such as two fuel tanks. Plurality of fuel tanks may be divided by septa 520 such that there is a septum between each fuel tank. In an embodiment, the septa 520 may extend from a lower outer mold line to an upper outer mold line of a tank 516. A top and bottom of tank 516 may be closed out by spherical end caps inset from the outer mold line to provide room for the outer mold line skin's supporting structure. This may assist aircraft 100 in resisting pressurization and simultaneously carrying the shear stress that is otherwise carried by the ribs of the airframe of aircraft 100.

Still referring to FIG. 5, tank 516 may be filled with a fuel, such as liquified gas fuel (e.g., hydrogen, propane, or natural gas). Hydrogen fuel may be stored as a compressed gas or in liquid form, however, liquid hydrogen may be used for airliner-scale systems. Liquified gas fuel may have a higher density than gaseous fuel. Additionally, liquified gas fuel may also allow for reduced tank pressure and tank weight. Liquified gas fuel may be kept at extremely low, cold temperatures, for example below a critical point of 33 Kelvin. Gas turbine engines, such as combustion engines, may operate on gaseous fuel and may transition liquified gas fuel into a gas before consumption; gaseous fuel may be supplied to the engine at high pressure, but typically no fuel pump is used. In some embodiments, the gas may squirt into a combustion chamber due to compressor stages. Fuel vapor from tank ullage may be produced by boil off from liquified gas fuel. This fuel vapor may be combined with the fuel vapor from fuel vaporized by heating. In some embodiments, this heating is produced by waste heat from another system. Such use of waste heat may provide an additional benefit by cooling the system that the waste heat originates from. In some embodiments, this heating is produced by an output of a fuel heater. A fuel heater may include, in non-limiting examples, an electric resistance heater or a combustion heater. Heat sources may be used alone or in combination. In some embodiments, this combined channel may then lead to engine for combustion. In some embodiments, this combined channel may then lead to a fuel cell or other system. In some embodiments, when engines and other systems are not using hydrogen vapor, it may be necessary for boil-off to be released from the tank to avoid excessive tank pressure. In some embodiments, such hydrogen vapor may be released overboard using a vent as described below. In some embodiments, hydrogen vapor consumption rates may vary by flight phase. In some embodiments, maximum hydrogen vapor may be used at takeoff, about ¼ of this may be used at cruise, and none may be used when the aircraft is inactive. In some embodiments, hydrogen vapor may be released overboard when the aircraft is using little hydrogen vapor.

Still referring to FIG. 5, in some embodiments, liquified gas fuel may boil, converting liquified gas fuel into a gas over time. As used herein, a "boil off rate" is a rate at which liquified gas fuel boils. In some embodiments, a boil off rate may be expressed as an amount of fuel (such as a mass of liquified gas fuel or a volume of liquified gas fuel) per unit time. Boil off rates for liquified gas fuel may be determined as a function of heat energy applied to the fuel. When liquified gas fuel boils, the remaining liquid is cooled. Tank 516 may also be refrigerated to remove heat from liquified gas fuel. The degree of insulation may be selected to provide a desired rate of boil-off. Insulation is further described below. The selected rate of boil-off for liquified gas fuel may generally be less than the rate at which liquified gas fuel is consumed by the engines and possibly other aircraft systems, such as without limitation an APU.

Still referring to FIG. 5, in some embodiments, liquid hydrogen may be stored at extremely cold temperatures. In a non-limiting example, liquid hydrogen may be stored at a temperature below −252° C. As liquid hydrogen warms it boils off and is lost. As a result, boil off rate is considered when employing liquid hydrogen as a fuel. In some embodiments, tank 516 may be insulated to prevent or minimize liquid hydrogen boil off. In a non-limiting example, insulation may include an inner wall and an outer wall with a vacuum chamber disposed between the inner wall and the outer wall. Vacuum within vacuum chamber prevents convective and conductive heat loss between inner and outer wall, so that substantially only radiative heat transfer may be possible between the two walls dramatically slowing heat transfer (and heating). Alternatively, or additionally, insulation may be located between inner wall and outer wall of fuel source. Exemplary non-limiting insulation materials include high loft materials, silica aerogel, polyurethane, polystyrene, fiberglass, and the like. In some cases, a reflective material may be used within a wall of a tank to slow radiative heat transfer, for example without limitation metallic materials with high polish like foil.

Still referring to FIG. 5, heat transfer is a function of surface area of a fuel tank and may be understood according to Newton's Law of Cooling. Whereas thermal compliance is a function of mass (volume multiplied by density). As a fuel tank increases in size, its volume increases more than surface area. This phenomenon may be understood as square-cube law, stated thus when an object undergoes a proportional increase in size, its new surface area is proportional to the square of the multiplier and its new volume is proportional to the cube of the multiplier. For example, imagine a cubic fuel source increases from a first length, $l_1$, to a second length, $l_2$. An area of fuel tank may increase thus:

$$A_2 = A_1 \left(\frac{l_2}{l_1}\right)^2$$

and a volume of fuel source increases thus $$V_2 = V_1 \left(\frac{l_2}{l_1}\right)^3$$

where $A_1$ is first surface area, $A_2$ is second surface area, $V_1$ is first volume, and $V_2$ is second volume. For example, a cube with a side length of 1 meter has a surface area of 6 m² and a volume of 1 m³. If dimensions of cube were multiplied by 2, its surface area would be multiplied by the square of 2 and become 24 m². Its volume would be multiplied by cube of 2 and become 8 m³. The original cube (1 m sides) has a surface area to volume ratio of 6:1. The larger (2 m sides) cube has a surface area to volume ratio of (24/8) 3:1. As dimensions increase, volume will continue to grow faster than surface area. Square-cube principle applies to all solids, not just cubes. In some embodiments, a large fuel tank may be selected, such as in order to minimize surface area and boil off.

Still referring to FIG. 5, in some embodiments, fuel may leak out of tank 516. As used herein, "leak rate" is a rate at which fuel leaks out of a tank and is not consumed. In some embodiments, fuel may leak out of the interior of a tank into an interstitial volume between an inner wall and an outer wall of the tank. In some embodiments, leak rate may be positively correlated with surface area of a tank. As described above, in a situation where leak rate is positively correlated with surface area of a tank, the square-cube law indicates that larger tanks may result in lower leak rate relative to the amount of fuel stored in the tank than smaller tank. Also, in a situation where the amount of insulation required is positively correlated with surface area of a tank, the square-cube law indicates that larger tanks may allow for lighter insulation relative to the amount of fuel stored in the tank than smaller tank. In some embodiments, a single tank may be used rather than multiple smaller tanks. In some embodiments, two larger tanks may be used rather than a higher number of smaller tanks. For instance, and without limitation, a tank size may be selected such that its surface area to volume ratio is below a certain threshold. Alternatively or additionally, where a leakage rate per unit of area is known for a given tank material, a tank may be selected having a proportion of hydrogen needed for a flight and/or series of flights such that the rate at which hydrogen is extracted from the tank exceeds the rate of leakage over the course of the flight by some threshold amount, where the threshold may be expressed as a difference and/or a ratio. Leakage rate may be measured using sensor feedback in flight conditions and/or in conditions simulating flight for different sizes and/or configurations of tanks.

Still referring to FIG. 5, in some embodiments, a tank having a low but non-zero leak rate may be used. In some embodiments, tanks that do not leak may have a downside of being comparatively heavy. In a non-limiting example, non-leaking aluminum tank designs may be heavy compared to alternate tank designs with acceptable leak rates. In some embodiments, a tank with a low but non-zero leak rate may be acceptable over a heavier tank such as an aluminum tank that does not leak. In some embodiments, a lighter tank with a low leak rate may save fuel compared to use of a heavier tank due to more fuel being necessary to propel a heavier aircraft. Leak rates may be lowered by, for example, minimizing surface area and recapturing leaked fuel.

Continuing to refer to FIG. 5, tank 516 may include at least a vent. In an embodiment, at least a vent may be configured to vent gaseous fuel from tank 516. Gaseous fuel may result from boil-off of liquified gas fuel as the fuel warms. In an embodiment, and without limitation, at least a vent may be configured to vent boil-off from tank 516. In some cases, at least a vent may include a check valve. In some embodiments, check valve may be configured to allow flow of fluids substantially only away from tank 516 while preventing back flow of vented fluid to tank 516. At least a vent may also include a pressure regulator. Venting gaseous fuel from a tank 516 prevents over-pressurizing or other events that may cause catastrophic damage or harm. It may also be desirable, when aircraft 100 is grounded, to connect a system of lines and tanks to at least a vent to collect the boiled-off fuel. In some cases, the collected gaseous fuel can be compressed by a pump into storage tanks and then cooled to liquid temperatures for reuse as aircraft fuel. In some embodiments, at least a vent may be heated. This may be accomplished using, in non-limiting examples, heat from a fuel heater, heat from a heater dedicated for this purpose, or excess heat from other systems. In some embodiments, heating at least a vent may prevent the vented gas from being extremely cold which may otherwise cause accumulation of frozen air and/or water vapor where the vented vapor meets the outside air.

Still referring to FIG. 5, tank 516 may include an insulation. In this disclosure, "insulation" is a component or layer configured to reduce heat transfer. Insulation may be used to reduce thermal transfer to liquified gas fuel inside of a tank 516. Heat may be transferred to tank 516 by at least two means: conduction and radiation. To reduce conduction, insulation may include a vacuum to separate an interior volume of tank 516 from an exterior with an evacuated vessel. Another means to reduce conduction in tank 516 may be an insulating material that inhibits conduction. Insulating materials include fiberglass wool, plastic or ceramic foam, aerogel, and other materials. Heat flow through an insulator can be inversely proportional to its thickness. For example, an insulator that is twice as thick may conduct heat at half the rate. Heat transfer by radiation may be reduced by reflective coatings. Reflective coatings may be located proximal to surfaces of tank 516 and/or on intermediate materials within insulation. For example, a dewar may be coated with a mirror-like material that reflects heat radiation; many thermos bottles are silvered for this reason. A "dewar" is double-walled flask of metal or silvered glass with a vacuum between the walls and configured to hold a liquid. Another means to reduce radiation may be to sandwich multiple layers of thin reflective foil within an insulative material such as foam. Additionally, a modest amount of insulation may be needed to limit boil-off to a rate below that needed to provide fuel vapor to the engines in cruise. On the ground, a system to capture boil-off liquified gas fuel may be provided. Another characteristic requirement for insulation includes surface area of a tank 516. A very large tank may provide a large volume of liquified gas fuel per unit surface area. Boil-off rate may be determined by heat transferred into tank 516. Heat transferred into the tank 516 may be a function of tank surface area and/or insulation effectiveness. For example, heat transferred into tank 516 may be proportional to tank surface area and/or inversely proportional to insulation effectiveness. For a given insulation and storage volume, tank 516 having a larger surface area may result in more boil-off. Or, for a given boil-off rate and storage volume, tank 516 having a larger surface area will need more insulation. As explained above, degree of insulation may be selected to provide a desired rate of boil-off. Insulation may also include a chamber located between the inner wall and the outer wall foams, aerogels, reflective materials, and the like of tank 516. Chamber may contain gas such as air, nitrogen, argon, or the like. In some cases, gas may be actively pumped into the chamber to ensure that the gas within the chamber is clean and dry and thereby not conducive to condensation, freezing or contamination.

Continuing to refer to FIG. 5, fuel tanks of the plurality of fuel tanks are located aft of cabin 524 in the main body. As used herein, "cabin" is the portion of the aircraft that holds the crew, passengers, and cargo. Fuel tanks are stored at least partially aft of the cabin 524, near the propulsors, as shown in FIG. 5. For the purposes of this disclosure, the fuel tanks are stored at least partially aft of the cabin 524 if at least a portion of the fuel tanks extends behind or "aft" of the rearmost portion of cabin 524. In an embodiment, because of the low density of liquified gas fuel, storing fuel tanks behind the cabin 524 of the aircraft 100 may not substantially affect the longitudinal center of gravity of the aircraft 100. Also shown in FIG. 5 is a depiction of a multi-lobe tank configuration. In a multi-lobe tank configuration, each tank 516 does not form a completely circular shape, such that the surface of tank 516 may deform to achieve pure tension. Multi-lobe tank configuration may be beneficial as it provides more tank volume compared to a singular spherical tank. Multi-lobe tank configuration may be derived by adding tanks in the junctions between tanks. Junctions are discussed in further detail with reference to FIG. 19. Fuel tanks, as discussed above, may provide structural support to the aircraft by acting as load bearing columns between the floor and ceiling of the aircraft 100. In an embodiment, fuel tanks may be mounted within the airframe. As used herein, an "airframe" provides structure to an aircraft. Airframe may be a part of the structural components of the aircraft 100. The plurality of fuel tanks may span across the full width of the aircraft 100. Because the ceiling of the aircraft is downward sloping, each tank 516 of the plurality of fuel tanks may vary in diameter and length. Fuel tanks may be stored vertically or horizontally. In an embodiment and as described above, tank 516 may be a vertically oriented multi-lobe tank wherein its pressurized walls and its septa 520 may extend from a lower outer mold line to an upper outer mold line of a tank 516. A top and bottom of tank 516 may be closed out by spherical end caps inset from the outer mold line to provide room for the outer mold line skin's supporting structure. This may assist aircraft 100 in resisting pressurization and simultaneously carrying the shear stress that is otherwise carried by the ribs of the airframe of aircraft 100. Fuel tanks may be stored in rows aft of the cabin 524. In an embodiment, there may be two rows of fuel tanks. In doubling the rows, each fuel tank 516 had a smaller tank wall radius, therefore each fuel tank wall is thinner and lighter.

Figure 6:
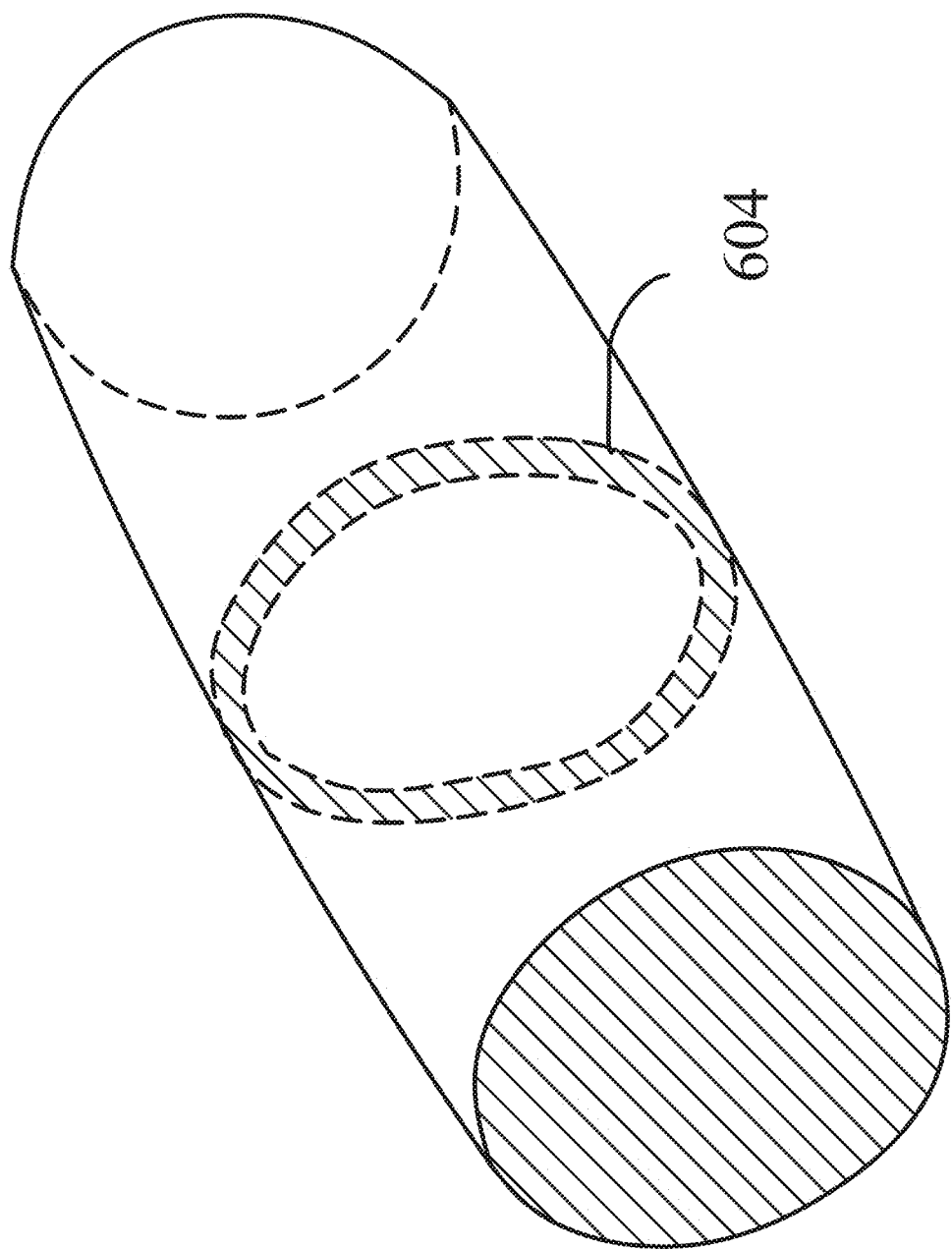
FIG. 6 is an exemplary embodiment of at least a tank with mathematical equations to calculate the force and stress of the at least a tank.

Now referring to FIG. 6, shown is an exemplary embodiment of at least a tank. In FIG. 6, force and stress of at least a tank may be considered in a cylindrical portion 604 and an end of the cylindrical portion. Stress within cylindrical portion may be calculated according to:

$$\text{Stress } = \frac{\pi r^2 P}{2\pi r t} = \frac{Pr}{2t}$$

where, r is radius of the cylinder, P is pressure, and t is thickness of tank wall. Force at end of the cylinder may be found according to:

$$\text{Force} = \pi r^2 P$$

A key component that may heavily impact shape of at least a tank is pressure. At least a tank may be far lighter if pressure is resisted in pure tension as compared to bending. In some embodiments, pure tension in a tank may be generally achieved by shapes that provide a circular cross section, including spheres, cylinders, and cones. In an embodiment, a pressurized tank of a given volume may be made as a sphere to place the tank in pure tension. Alternatively, a tank made as a cube may require tank walls to operate in bending; thus, the cube tank would likely be vastly heavier than a sphere tank of similar volume. Accordingly, in some embodiments, any tank geometry may provide tank walls acting in tension.

Still referring to FIG. 6, the walls of at least a tank may operate at or below a limit stress. A "limit stress" is a threshold stress below which a tank may operate at to avoid failure or damage. Stress may be defined in hoop direction or longitudinal direction. As shown in FIG. 6, stress of a thin-wall cylindrical tank may be calculated in the hoop direction by multiplying the pressure (e.g., in lb/in$^2$) by the radius (e.g., in inches), and then dividing that value by the tank wall thickness (e.g., in inches). Also as shown in FIG. 6, the stress of a thin-wall cylindrical tank may be calculated in the longitudinal direction by dividing the hoop stress in half. The mathematical equation shown for stress may be found by first calculating a force by multiplying pi by the radius squared and the pressure. The force is then divided by 2*π*r*t to calculate the stress. Thus, the equation simplifies to half the hoop stress, or P*r/2*t. The maximum stress in a cylindrical tank is the vector sum of the hoop and longitudinal stresses. A thin-wall hemisphere provides equal stress everywhere of P*r/2*t. A cylindrical tank may be fabricated with end caps. As used in this disclosure, an "end cap" is an end of a tank and/or a compartment of a tank. End caps, like tanks themselves, may have curvature. Generally, end caps may have a constant curvature, for example spherical. In some cases, end caps may be nearly-spherical, elliptical, cylindrical, or the like. In some cases, an end cap may be spherical and have a radius similar to that of the cylinder which it is capping. In this case, the end cap may be considered ideally selected for resisting stresses, however more volume within the aircraft cabin is likely wasted (from the bulging end cap). Instead in some cases, end cap may be selected to compromise resistance to stress in exchange for improved cabin volume utilization. For example, where end caps are spherical and have twice the radius of the cylinder they are capping, stresses in all parts of the tank may be similar or below that of those stresses within the cylindrical portion of the tank (assuming tank skin thickness is constant).

Now referring to FIGS. 7-19, exemplary tank geometries are illustrated. At least a tank may include a shape, or tank geometry, having a plurality of curved surfaces. All tank geometries may exist in pure tension, and at least a tank may have any of the tank geometries described herein.

Figure 7:
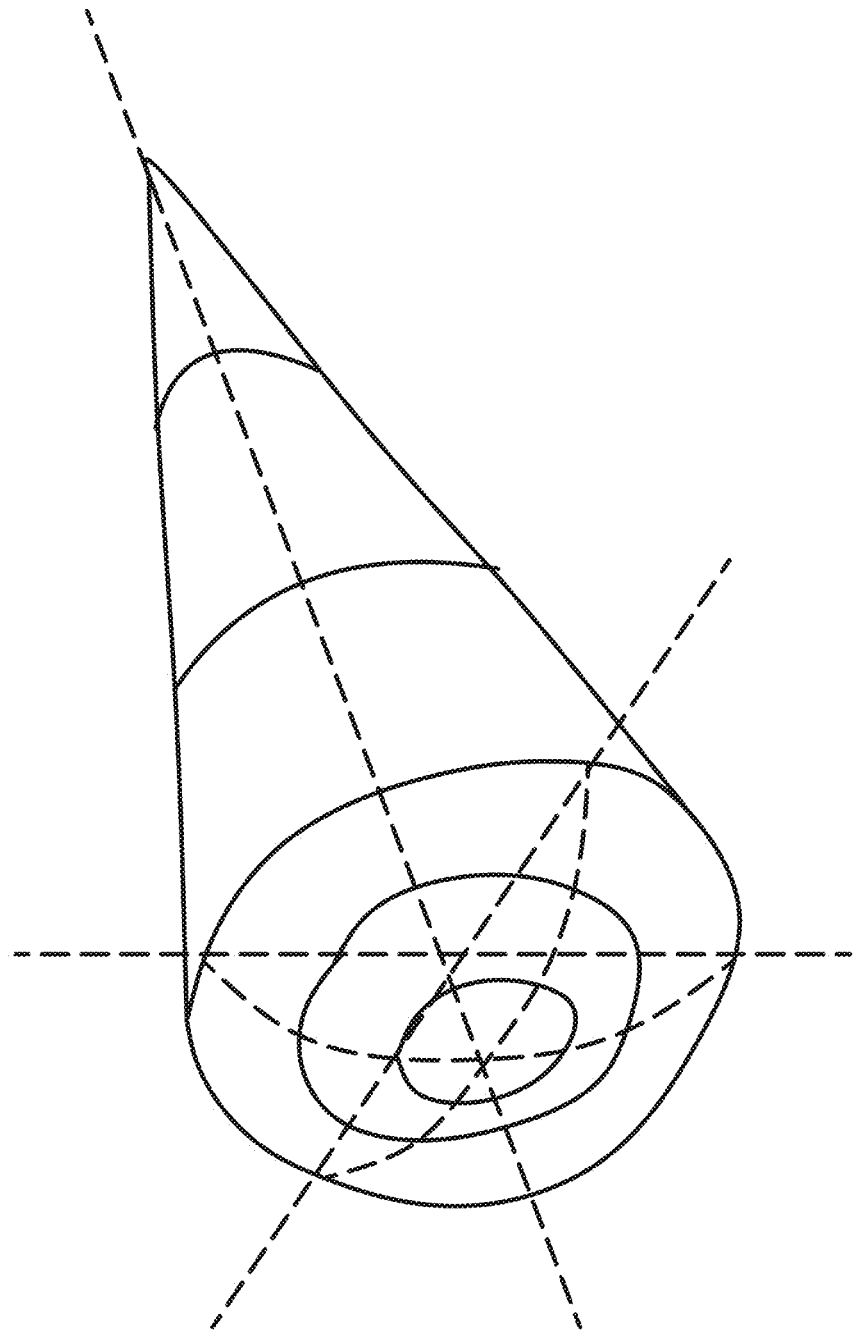
FIG. 7 is an isometric view of an exemplary embodiment of a conical tank.

Now referring to FIG. 7, an isometric view of an exemplary embodiment of a conical tank is illustrated. At least a tank may include a conical tank. A "conical" tank is a type of tapered tank that has a cone-shaped tank geometry. Conical pure-tension tank shapes may include spherical and cylindrical shapes, possibly with spherical end caps. For example, a tank could be conical with a spherical end cap. This might resemble an ice cream cone. This cone may be truncated, with another spherical end cap on the opposing end.

Figure 8:
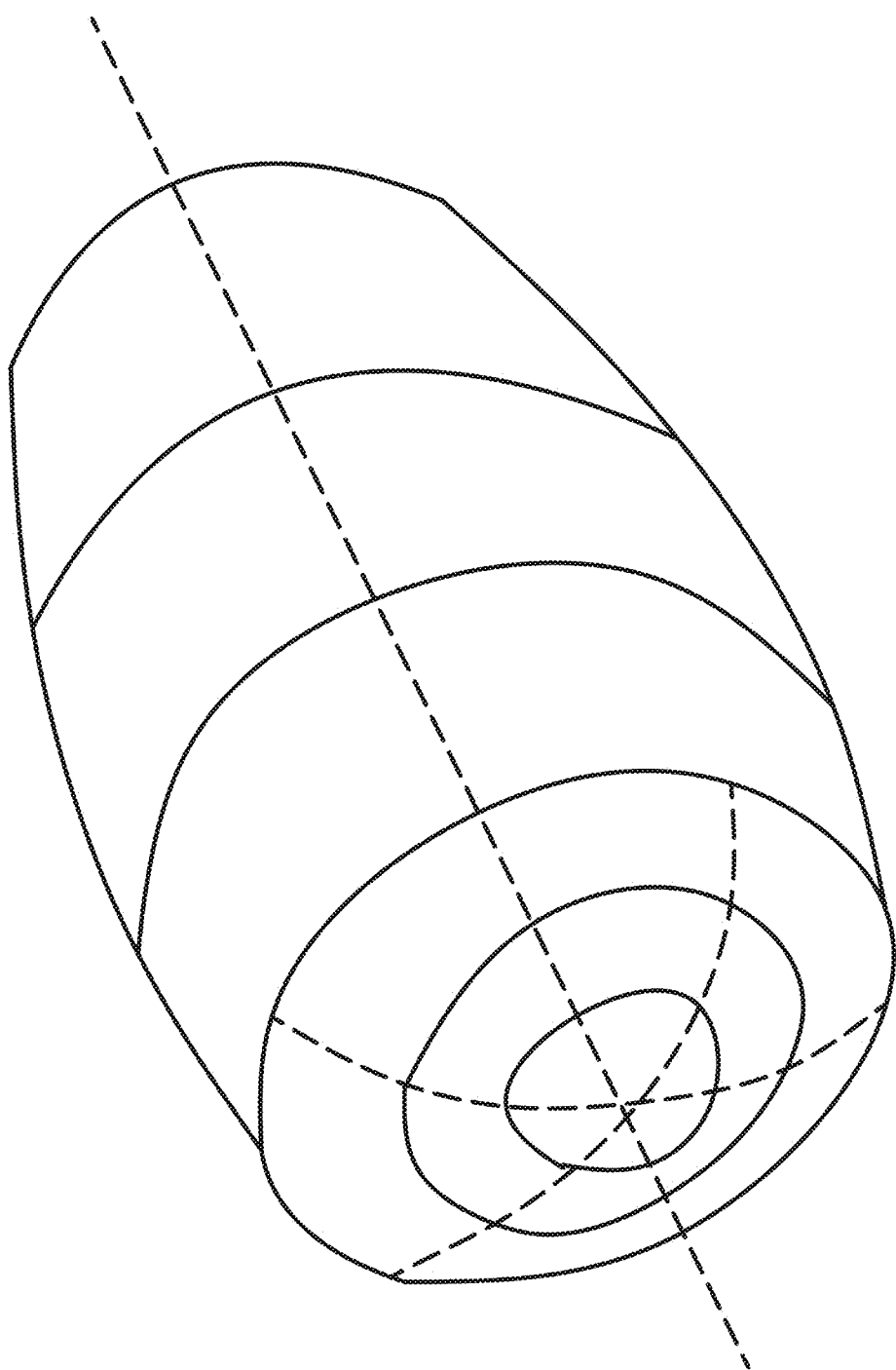
FIG. 8 is an isometric view of an exemplary embodiment of a curved axisymmetric tank.

Now referring to FIG. 8, an isometric view of an exemplary embodiment of a curved axisymmetric tank is exhibited. At least a tank may be a curved axisymmetric tank. Another type of tapered tank, a "curved axisymmetric tank" has a circular cross-section with compound curvature on the sides or ends. Curved axisymmetric tank may be capped with hemispheres. A curved axisymmetric tank may more efficiently fill a volume with variable depth.

Figure 9:
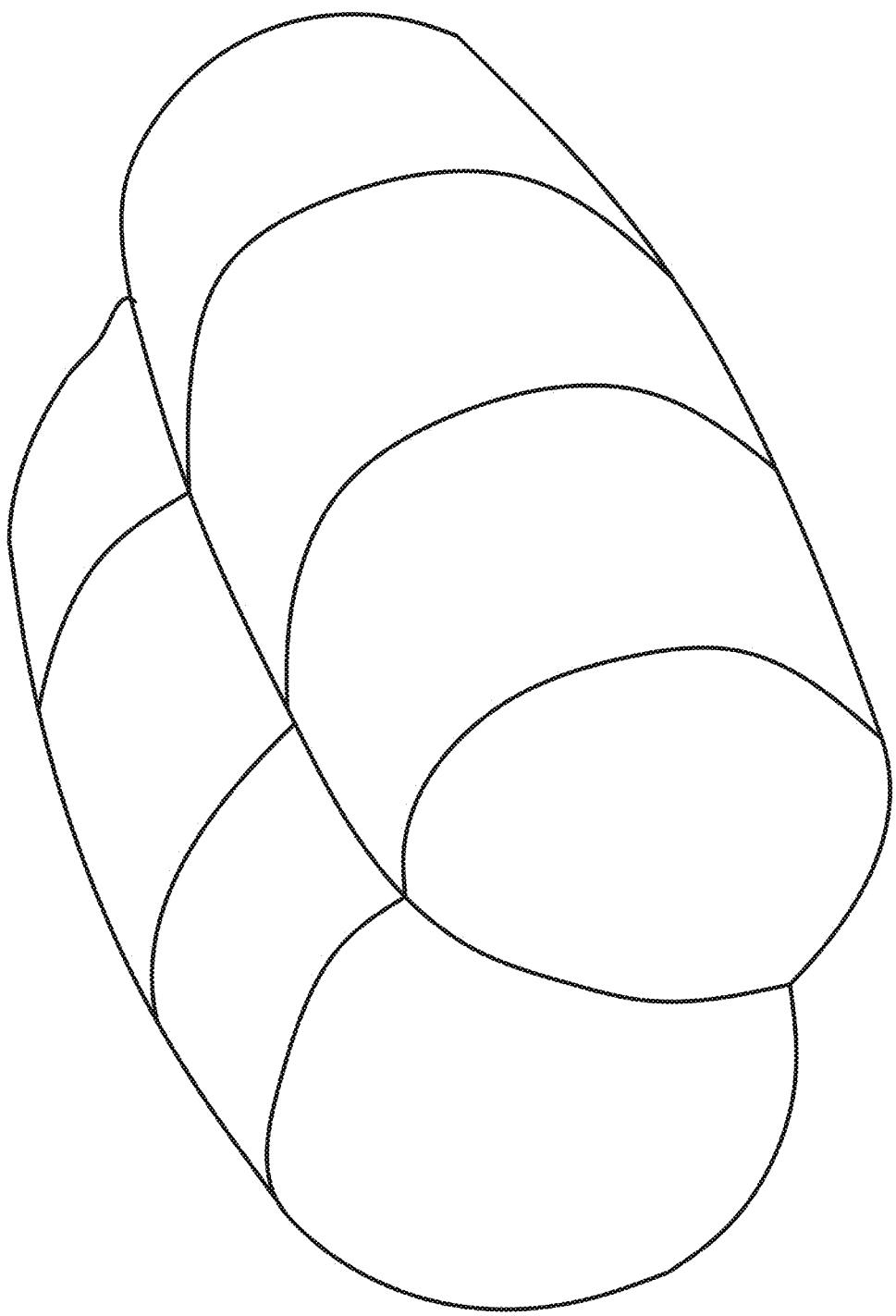
FIG. 9 is an isometric view of an exemplary embodiment of a double-curved tank.

Now referring to FIG. 9, an isometric view of an exemplary embodiment of a double-curved tank is presented. At least a tank may be a double-curved tank. A "double-curved tank" occurs when a tapered tank is merged with a similar or mirror-image tank with a central septum. The two tanks comprising a double-curved tank may be intersected along their length and a septum may be placed at the tank junction to address the resulting tension. In this disclosure, a "central septum" is a partition centrally located in a system separating two compartments. In some cases, central septum may not be parallel to the tank axis; for example, it may be favorable to fill a volume of constant width with a curved, variable-height ceiling. Tank axis may then be adjusted so that the tank wall on the outer side of the tank may be a selected distance from the cabin wall.

Figure 10:
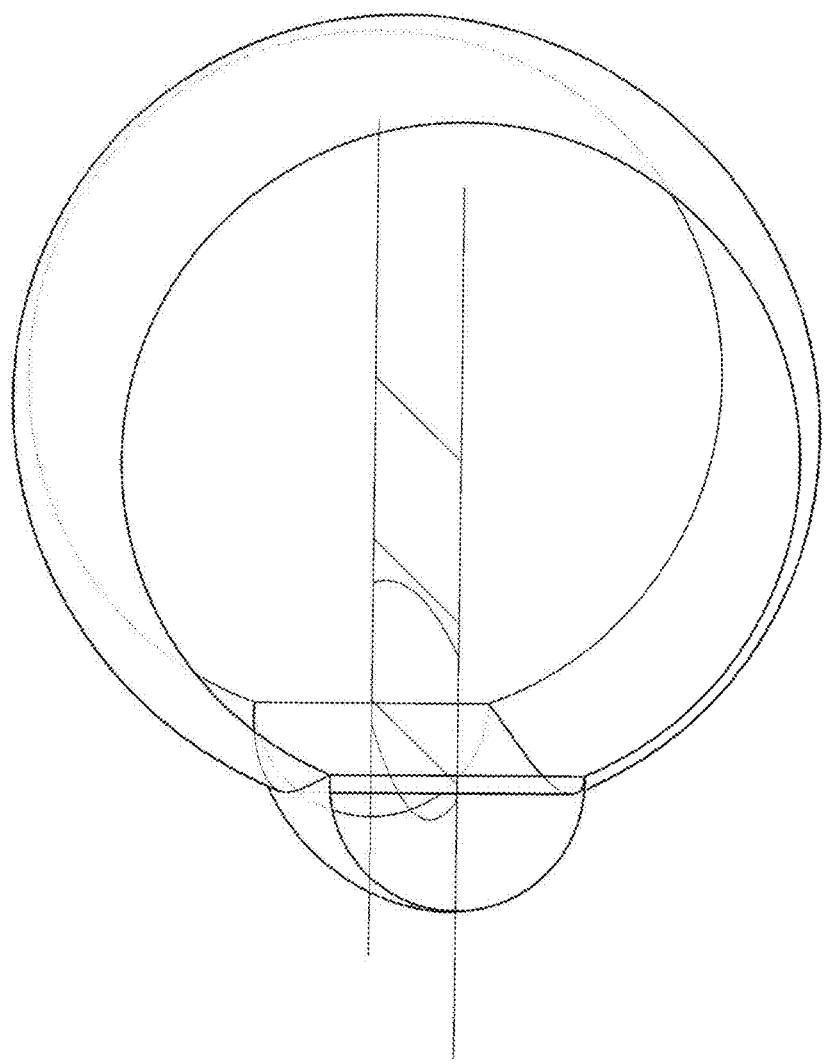
FIG. 10 is a front quarter view of an exemplary embodiment of a dual tank with different diameters.

Now referring to FIG. 10, a double-curved tank need not have identical compartments; a front quarter view of an exemplary embodiment of a dual tank with different diameters is illustrated. At least a tank may be a dual tank with different diameters. In some compartments in this embodiment, height on one side of the compartment may be lower than on the other. Two or more compartments in at least a tank may have different diameters if the ceiling height is different across the cabin. The two or more tanks may be joined with one or more septa that may form a curved surface as seen in top view, see cambered tanks below. In an embodiment, the shapes of the compartments may differ. In this case, the two merged tanks (dual tank) may have different diameters to maximize their height along their length.

Figure 11:
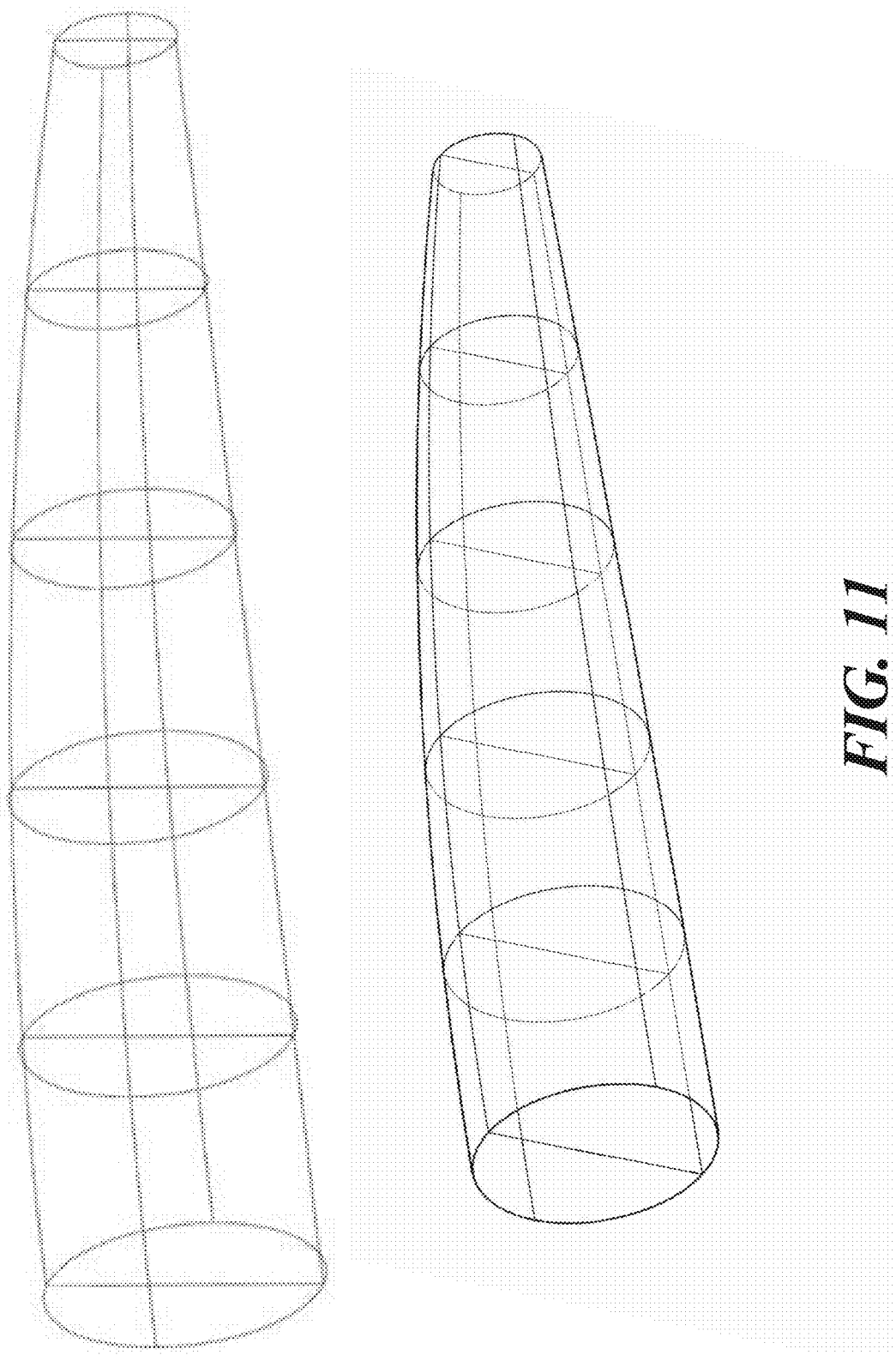
FIG. 11 is a quarter side view of an exemplary embodiment of a cambered, tapered tank.

Now referring to FIG. 11, some tapered tanks may be sheared so that instead of following a straight centerline, at least a tank follows a curved camber line. Shown in FIG. 11 is a quarter side view of an exemplary embodiment of a cambered, tapered tank. The camber line enables the tank to more efficiently fit a volume with variable depth but one flat side, for example a floor, while conforming more closely to, for example, a curved ceiling. This results in a centerline that may be curved as seen in the figure. An example may be shown in wireframe and surface views. This tank geometry may have a flat bottom and a curved top.

Figure 12:
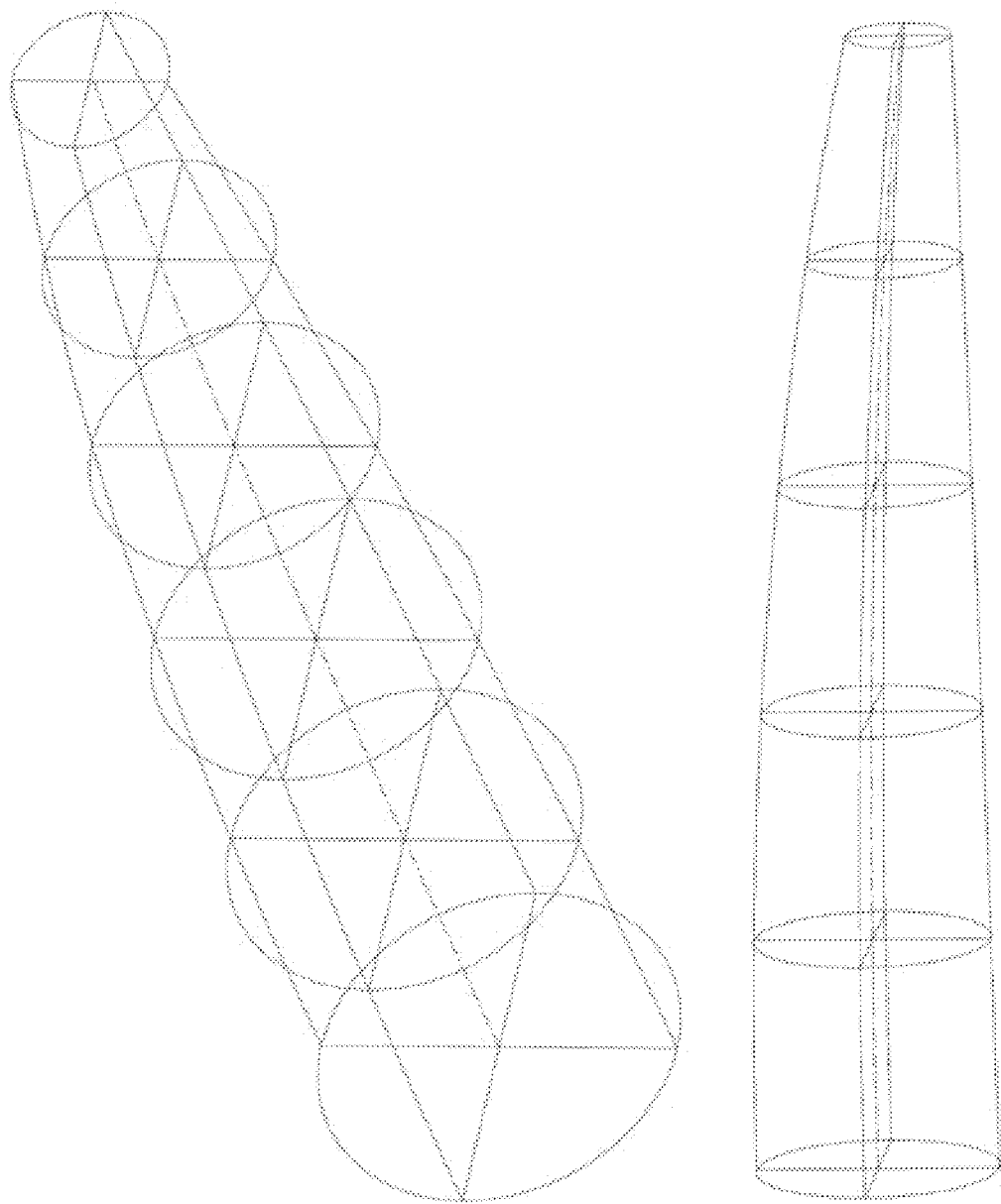
FIG. 12 illustrates an isometric and side quarter views of an exemplary embodiment of a dual cambered tank.

Now referring to FIG. 12, an isometric and side quarter views of an exemplary embodiment of a dual-cambered tank is presented. At least at tank may be a dual-cambered tank. A "dual-cambered" tank is the same as normal cambered tank, but the camber line may be curved from the top view as well as the side view. Two cambered lines can place the outer surface of the tank at a selected distance from the cabin wall. The bottom and right edge of at least a tank may be straight while the top view and side view of camber line may be curved. Circular cross sections of the tank may be sheared so that they remain circles in the lateral-vertical plane, for example. Alternatively, circular cross sections may be orthogonal to the camber line. From a stress standpoint, wherever the camber line curvature of the tank is modest, the stress difference is probably very small.

Figure 13:
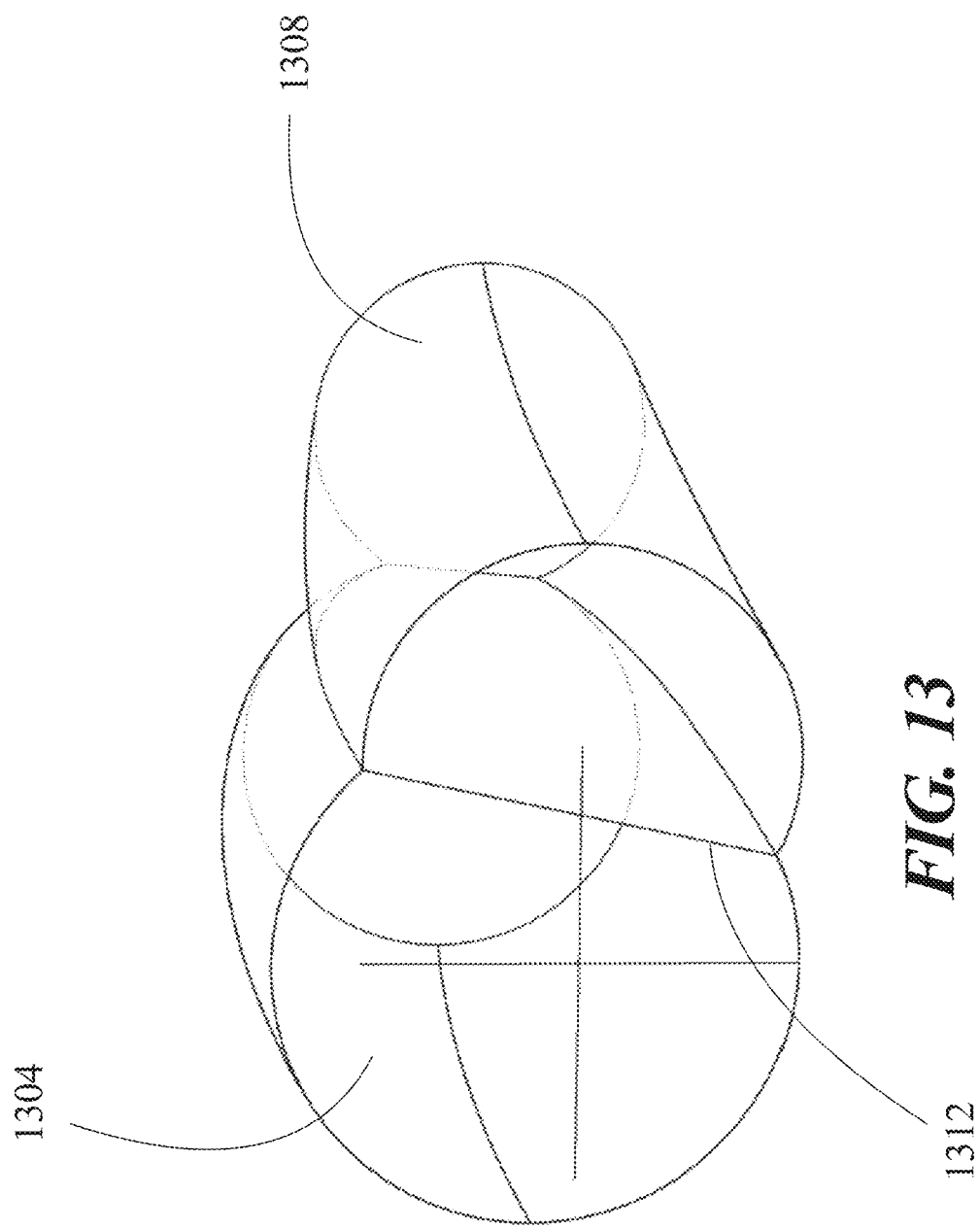
FIG. 13 shows a quarter front view of an exemplary embodiment of a double tank.

Now referring to FIG. 13, a quarter front view of an exemplary embodiment of a double tank is shown. The double tank, as explained above, may have a first compartment of at least a tank 1304, a second compartment of at least a tank 1308, and a curved septum 1312 separating the two compartments of at least a tank.

Figure 14:
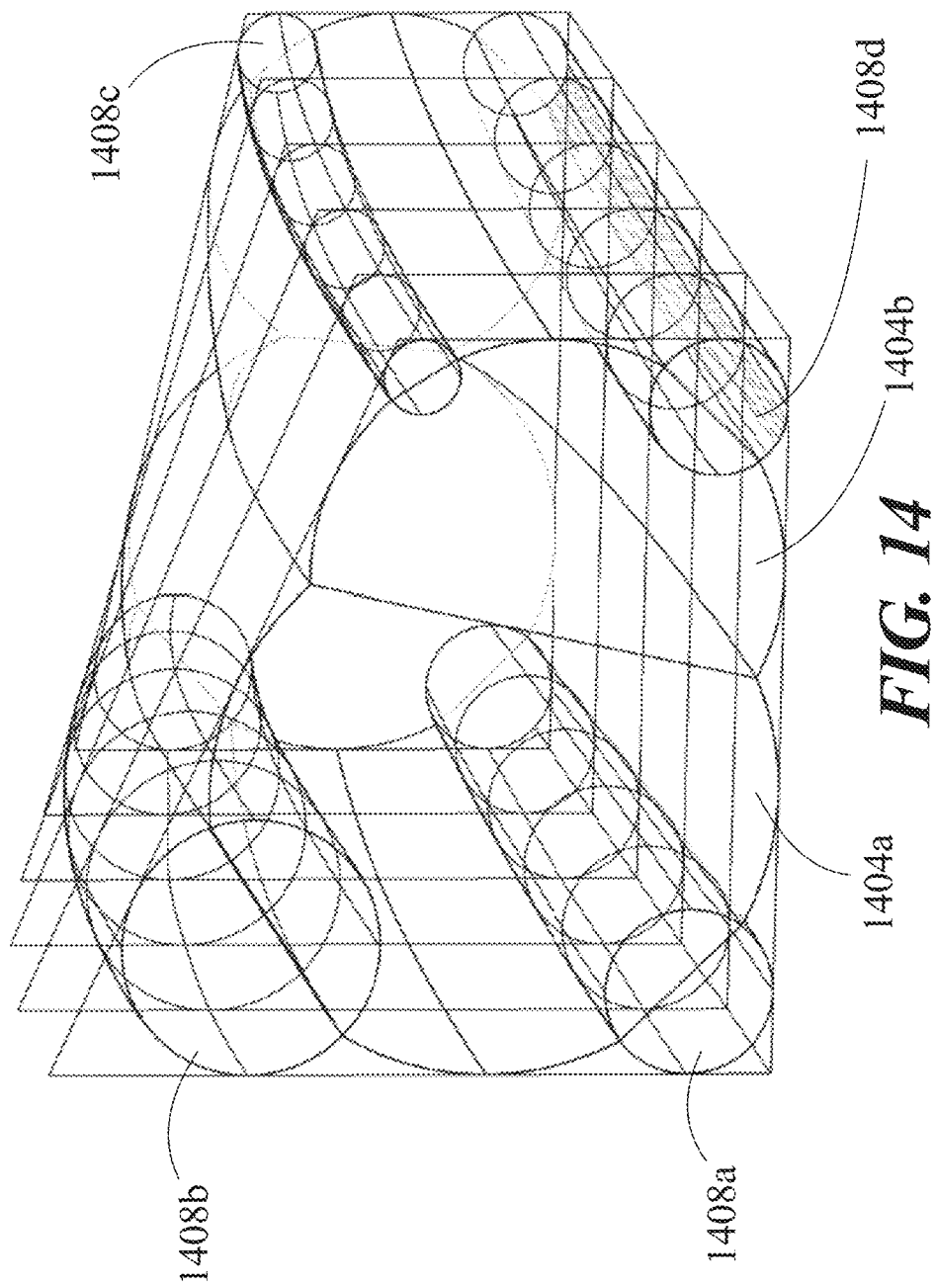
FIG. 14 is a front quarter view of an exemplary embodiment of a multi-bubble tank without trimming.
Figure 15:
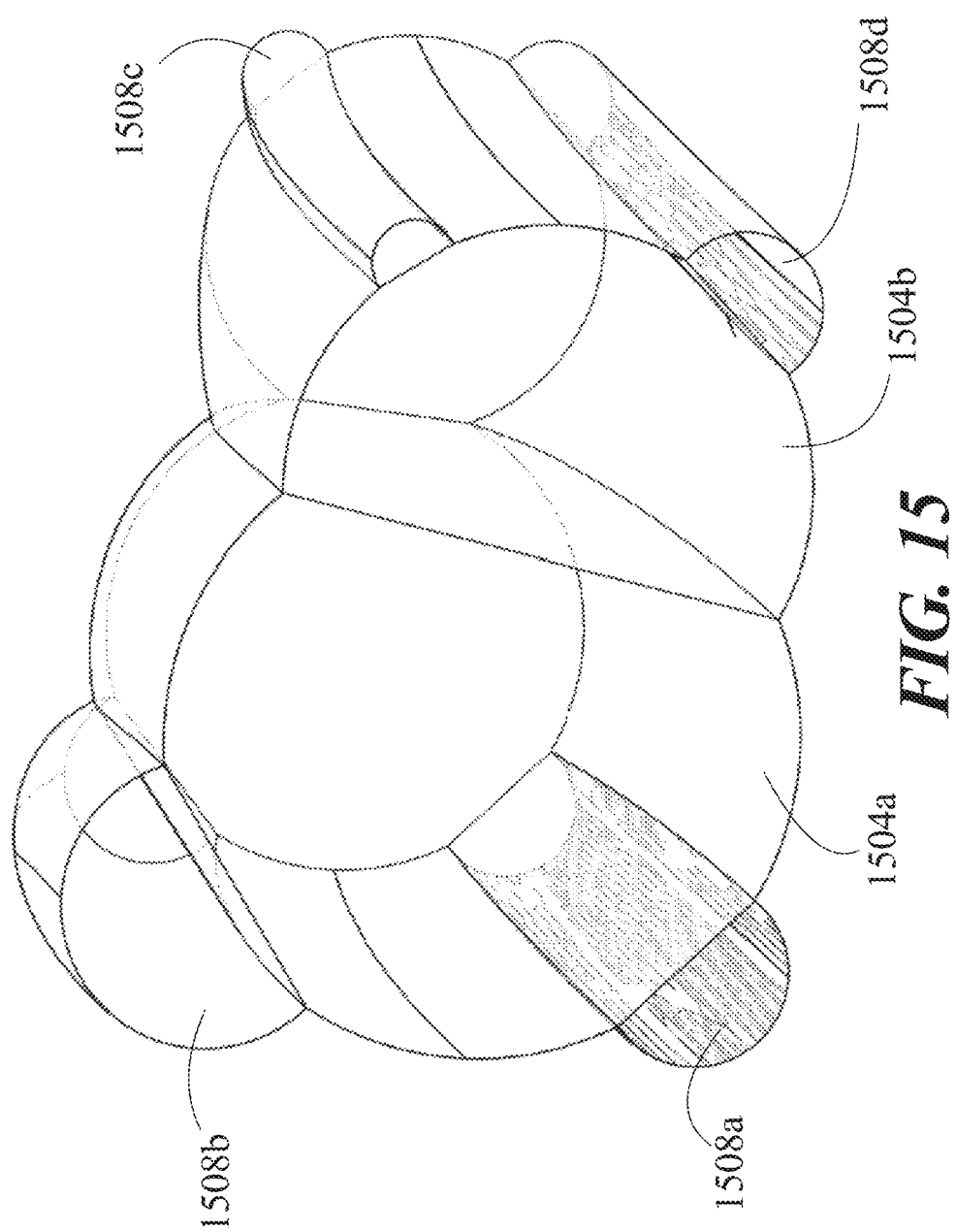
FIG. 15 is a front quarter view of an exemplary embodiment of a multi-bubble tank trimmed with septa.

Now referring to FIGS. 14 and 15, a front quarter view of an exemplary embodiment of a multi-bubble tank is illustrated in both figures. Given a rectangular cabin cross-section with a longitudinally oriented tank, this cross-section may be occupied by a single circular cross-section tank. Or, as noted above, a double tank may be used to provide greater cross-section area within the rectangular cabin. Additional bubbles may be added to fill in the four corners. As used herein, a "multi-bubble tank" is a tank that has more than two compartments attached together. In some cases, two more bubbles may be added to fill in the valleys between the two main tanks (the main tanks being lobes 1404*a* and 1404*b* in FIGS. 14 and 1504*a* and 1404*b* in FIG. 15). Multi-bubble tanks may have any number of compartments, but there may be a diminishing return on increasing complexity; either engineering judgment or actual engineering may be applied. In an embodiment, a multi-bubble tank may have four lobes (lobes 1408*a*, 1408*b*, 1408*c*, and 1408*d* in FIG. 14 and lobes 1508*a*, 1508*b*, 1508*c*, and 1508*d* in FIG. 15) and added to fill in the corners of a notional envelope indicated by the lines in FIG. 14. This provides a more valuable tank volume for a given compartment volume. Each compartment may have a circular cross section as shown, which may be trimmed to the large, main lobes. The main lobes may then be trimmed to small lobes. Each junction may be then faced with a septum. This "trimming" can be seen in FIG. 15, wherein the tank is trimmed with septa. On the other hand, the multi-bubble tank in FIG. 14 does not have trimming. At least a tank may or may not have trimming.

Figure 16:
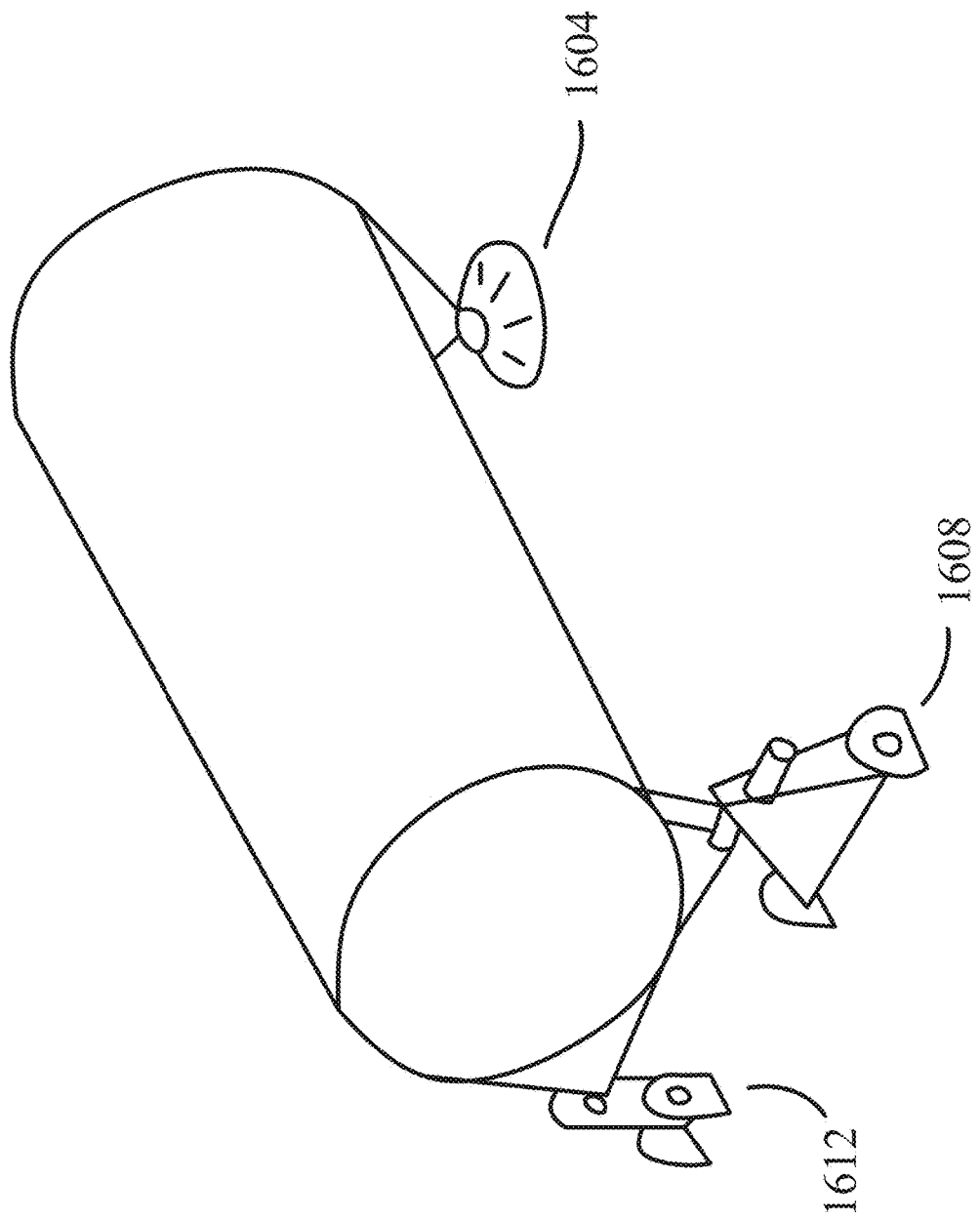
FIG. 16 illustrates an isometric view of an exemplary embodiment of a tank with a plurality of tank support links.

Now referring to FIG. 16, an isometric view of an exemplary embodiment of a tank with a plurality of tank support links is shown. At least a tank needs to be mounted into aircraft 100, usually inside the body. As explained above, at least a tank may be a permanent tank, meaning it may be mounted to the aircraft for an extended period of time. At least a tank and blended wing body 104 may be constructed separately, and then at least a tank may be mounted within. In an embodiment, at least a tank and BWB 104 may be independent because the structural load paths of aircraft 100 may not pass through at least a tank, and the structural load paths of at least a tank may not pass through BWB 104, except insofar as necessary to restrain at least a tank within BWB 104. Given this constraint, there are at least two conceptual methods for tank support links to mount at least a tank to BWB 104: rigid and linked mounts.

Still referring to FIG. 16, at least a tank may be mounted to BWB 104 using a rigid mount. At least a tank may be a standalone structure and may be connected to the BWB 104 with one or more rigid connections. A "rigid mount" or "rigid connection" is a type of link that does not allow for free movement in any direction; the link is rigid and/or non-movable. For example, if at least a tank is a longitudinally-mounted cylindrical tank, it may have a series of feet on either side, which may be connected to the structure of at least a tank. These feet may also be connected, for example, to a cabin floor structure. Additionally, the rigid mount may impose loads on BWB 104 and at least a tank. In an embodiment, during a flight maneuver, aircraft 100 may stretch, compress, or deform slightly, which may ultimately and slightly alter the location of the example feet mounting points. Overall, this ensues some deformation of the structure of at least a tank and may impose additional loads on the tank that result in an unfavorably heavier design. Additional feet may be provided to distribute the load of at least a tank more widely into BWB 104. For example, feet may also connect the tank to cabin walls, the cabin ceiling structure, and the cabin aft pressure bulkhead. This arrangement may not be intended to reinforce BWB 104 by its connection to at least a tank. Also, it may not be intended to reinforce at least a tank by its connection to BWB 104.

Still referring to FIG. 16, at least a tank may be mounted to BWB 104 using a linked mount. A standalone tank structure may be connected to the airframe in such a way that airframe deformation may not result in tank deformation, and vice-versa. This can be achieved through two ways to mount the tank: through its feet as described above, and through a series of links that may have hinges or ball-joints. A "linked mount" is a way to attach an object to another object that allows movement in one or more directions. With reference to the feet of at least a tank as described above, to avoid structure deformation, the feet may be mounted to the airframe with rubber fittings that provide compliance. Exemplary feet include mounts manufactured by LORD Corp., of Williston, Vermont. A series of links that may have hinges or ball-joints may also mount at least a tank to aircraft 100 without structural deformation occurring. For example, and as shown in the figure, at least a tank may be mounted at three points forming a triangle: a first point may be a rigid connection that provides location in three axes, a second point may be a link that provides substantially two (vertical and lateral) location, and a third point may be a link that provides substantially one (vertical) location. These three points are seen in the figure as links 1604, 1608, and 1612, respectively. Link 1604 may support vertically, laterally and longitudinally. Link 1608 may support vertically and laterally because it may be pivoted about a lateral axis. Link 1612 may provide only vertical support because it has ball joints at each end. A combination of links 1604 and 1608 may resist yaw and pitch motion. A combination of links 1608 and 1612 may resist roll. Altogether, motion of at least a tank may be restrained against motion and rotation through the use of tank support links. A relative change in length between at least a tank and BWB 104 may be accommodated by Links 1608 and 1612 pivoting fore-aft. A relative change in width may be accommodated by Link 1612 pivoting laterally. A relative change in height may be unconstrained.

Torsion applied to at least a tank by Links 1608 and three may be accommodated by a spherical or cylindrical connection at link 1604. One skilled in the art can provide alternate ways to achieve these objectives.

Figure 17:
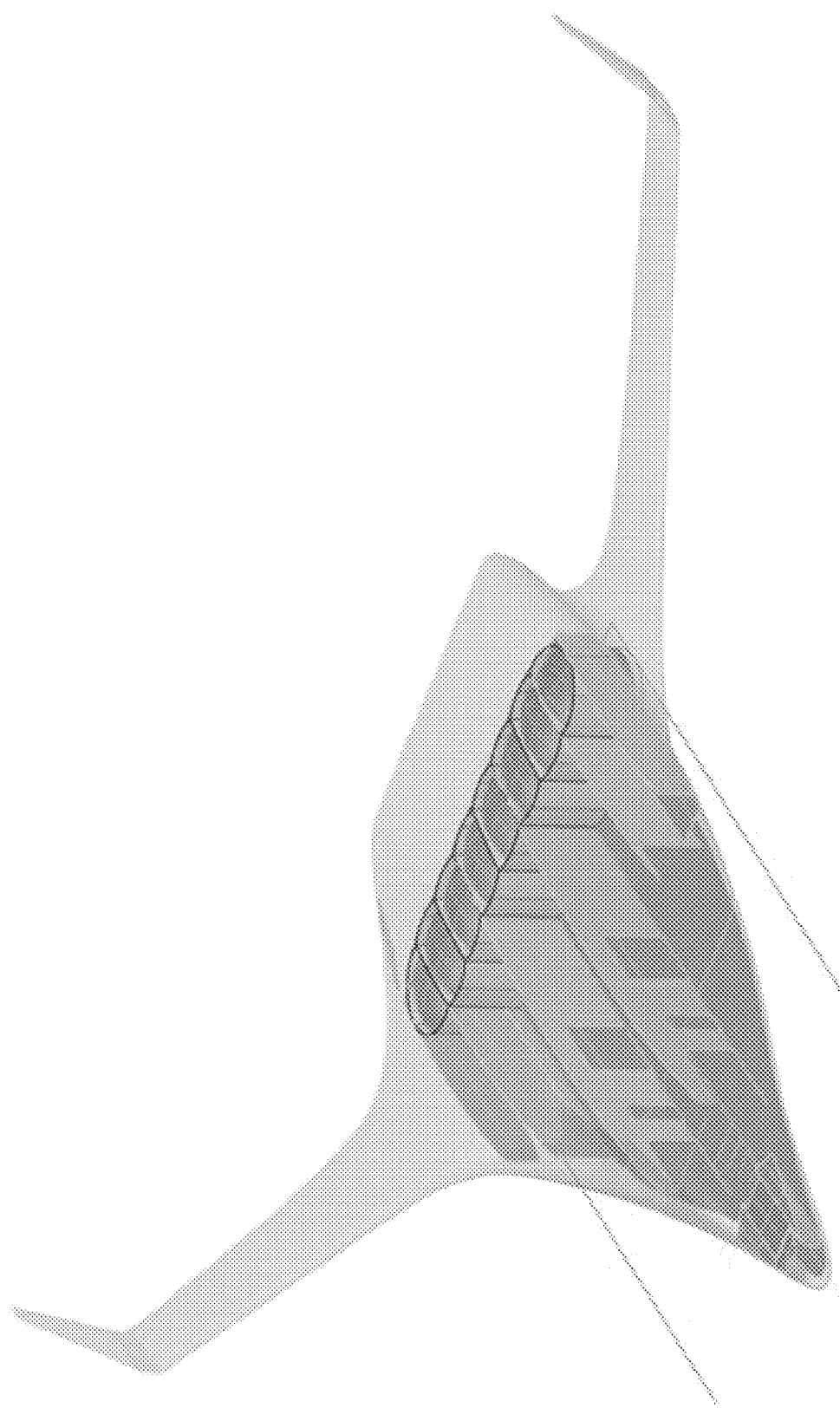
FIG. 17 shows an exemplary embodiment of an overview of a vertical axis "air mattress" tank.

Now referring to FIG. 17, an exemplary embodiment of an overview of a vertical axis "air mattress" tank is exhibited. An "air mattress" tank refers to a multi-bubble tank, where each of a lobes' upper and lower surfaces have a common center point. When the lobes of at least a tank do not form a near-circular shape, the surface of at least a tank may deform in order to achieve pure tension. As shown in the figure, the "air mattress" may extend laterally. Additionally, for example, "air mattress" may extend longitudinally as shown in FIG. 17. In an embodiment and as described above, at least a tank may be a vertically oriented multi-bubble tank wherein its pressurized walls and its septa may extend from a lower outer mold line to an upper outer mold line of a blended wing body. A top and bottom of at least a tank may be closed out by end caps inset from the outer mold line to provide room for the outer mold line skin's supporting structure. This may assist BWB 104 in resisting pressurization and simultaneously carrying the shear stress that is otherwise carried by structural members of BWB 104. Also, as shown, at least a tank may extend across the full width of the cabin and outboard cargo bays.

With continued reference to FIG. 17, in some embodiments, at least a tank may connect the at least a tank to at least an upper skin and at least a lower skin of the blended wing body. Furthermore, the upper and lower skins of BWB 104 may be structurally supported by one or more septa of at least a tank. In this disclosure, the "upper and lower skins" of the BWB 104 refer to the upper and lower surfaces of an outer mold line of BWB 104. In some cases, center body of BWB 104 may be pressurized, relative ambient pressure which is typically below atmospheric (sea level) pressure at elevation. Therefore, in some cases, an upper skin and a lower skin may be forced away from one another by a resultant pressure differential. In some embodiments, additional structural support between walls of at least a tank (e.g., septa and/or tank walls) and upper and lower skins of BWB 104 may resist pressure. In some cases, use of at least a tank as a structural element of BWB 104 may reduce weight. In FIG. 17, walls of at least a tank may be shown to extend to upper and lower skins, while end caps of at least tank may be shown inset to provide clearance from the structure that supports the skins.

Figure 18:
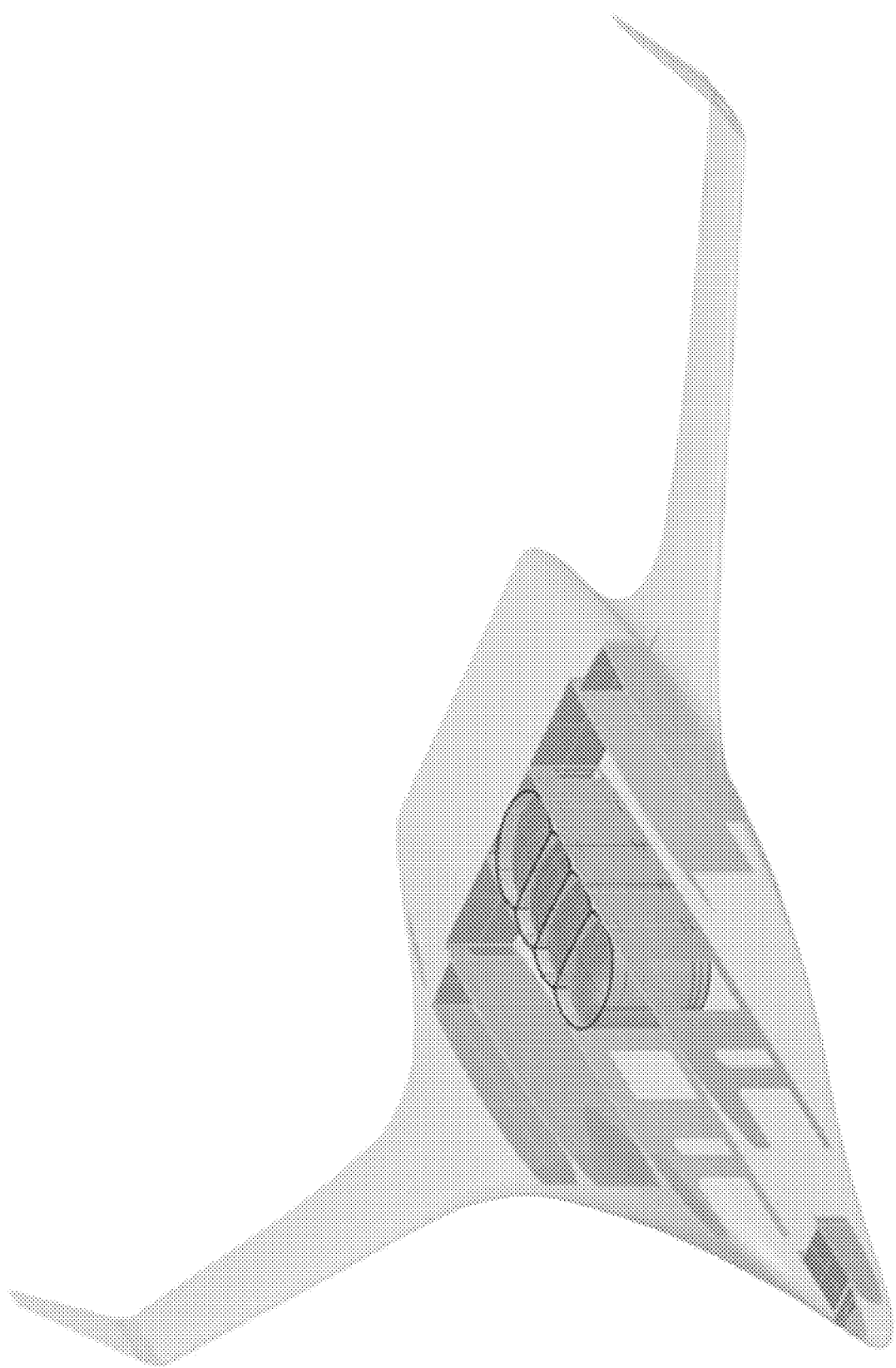
FIG. 18 shows an exemplary embodiment of an overview of longitudinal arrangement of a vertical axis "air mattress" tank.

Now referring to FIG. 18, an exemplary embodiment of an overview of longitudinal arrangement of a vertical axis "air mattress" tank is shown. As said above, the "air mattress" extends laterally but could also, for example, extend longitudinally. FIG. 18 shows at least a tank within a center bay. There are many ways to arrange vertical "air mattress" type tanks and this longitudinal arrangement may provide mutual support between BWB 104 and at least a tank. In some embodiments, a length of at least tank into BWB 104 may be varied by either varying a diameter of at least a tank or by doubling (or more) a number of rows of at least a tank. In a doubled tank, there may be a center lateral septum that replaces what is shown as the forward curved tank walls; this septum may be planar. In some cases, doubling (or more) the number of rows of at least a tank may result in a smaller tank wall radius and a thinner and lighter tank wall (when compared to a single row of equal total longitudinal dimension).

Figure 19:
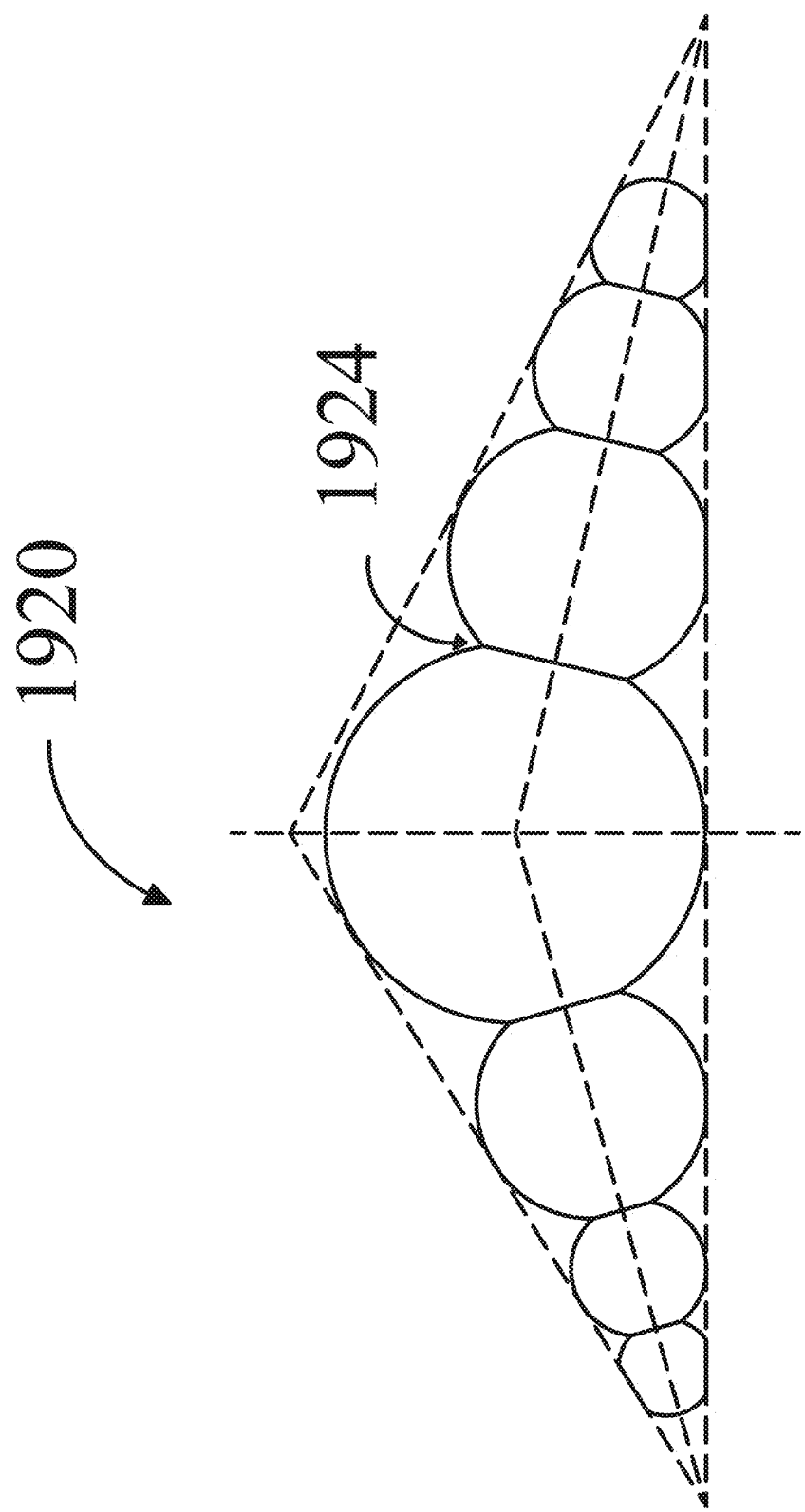
FIG. 19 illustrates a cross-section of an exemplary multi-chambered tank.

Now referring to FIG. 19, an exemplary embodiment of a cross-sectional view of tank having multiple chambers is illustrated. Multi-chambered tank 1920 may provide pure tension for each chamber wall and septa at each junction 1924. Pure tension may be achieved by equal pressure in each chamber of the tank 1920. In some cases, junctions 1924 may include convex junctions.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 20:
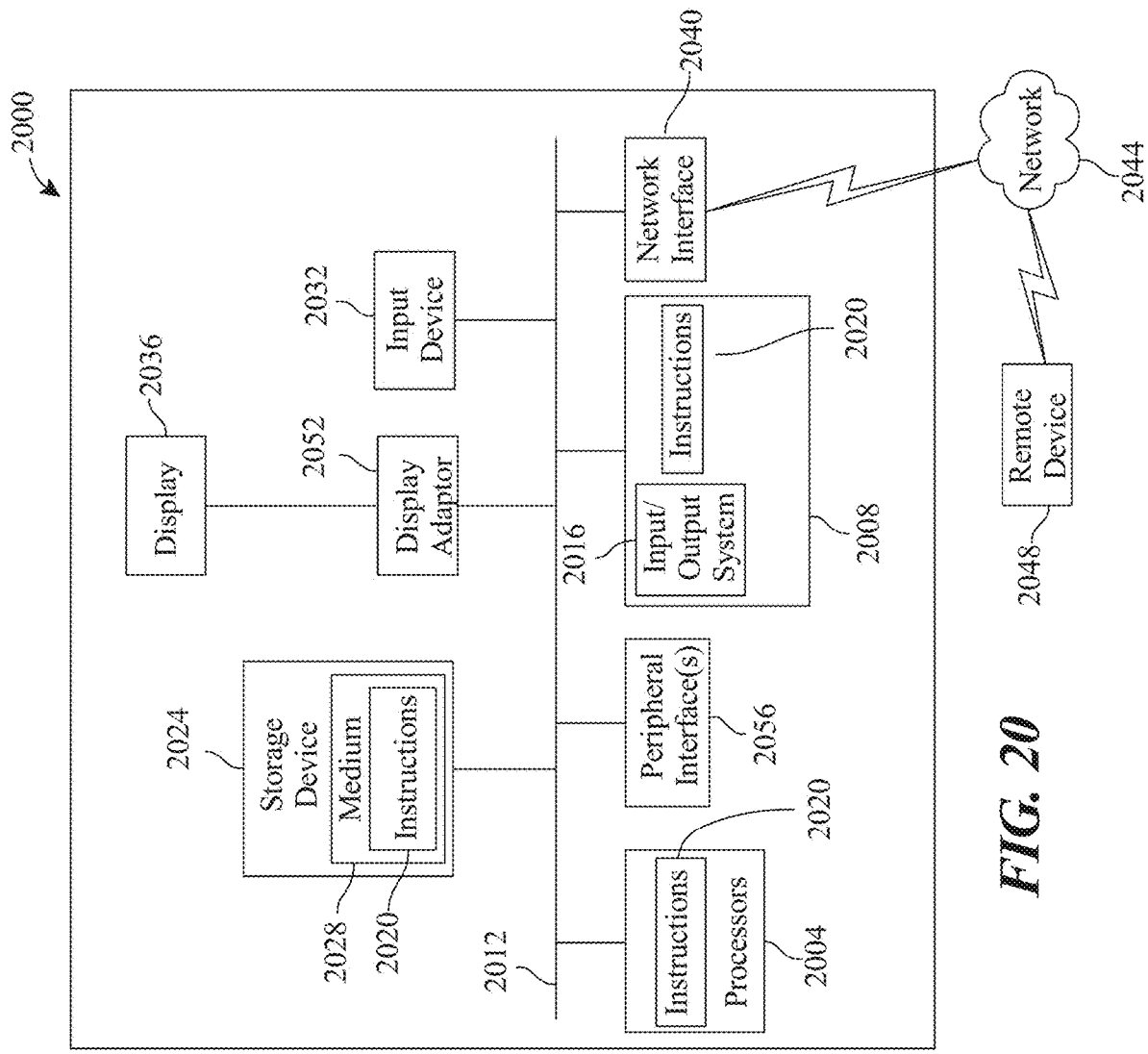
FIG. 20 is a block diagram of a computing system that can be used to implement any one or more of the methodologies disclosed herein and any one or more portions thereof.

FIG. 20 shows a diagrammatic representation of one embodiment of a computing device in the exemplary form of a computer system 2000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2000 includes a processor 2004 and a memory 2008 that communicate with each other, and with other components, via a bus 2012. Bus 2012 may include any of several types of bus structures including, but not limited to, a memory bus, a memory controller, a peripheral bus, a local bus, and any combinations thereof, using any of a variety of bus architectures.

Processor 2004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 2004 may be organized according to Von Neumann and/or Harvard architecture as a non-limiting example. Processor 2004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 2008 may include various components (e.g., machine-readable media) including, but not limited to, a random-access memory component, a read only component, and any combinations thereof. In one example, a basic input/output system 2016 (BIOS), including basic routines that help to transfer information between elements within computer system 2000, such as during start-up, may be stored in memory 2008. Memory 2008 may also include (e.g., stored on one or more machine-readable media) instructions (e.g., software) 2020 embodying any one or more of the aspects and/or methodologies of the present disclosure. In another example, memory 2008 may further include any number of program modules including, but not limited to, an operating system, one or more application programs, other program modules, program data, and any combinations thereof.

Computer system 2000 may also include a storage device 2024. Examples of a storage device (e.g., storage device 2024) include, but are not limited to, a hard disk drive, a magnetic disk drive, an optical disc drive in combination with an optical medium, a solid-state memory device, and any combinations thereof. Storage device 2024 may be connected to bus 2012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2024 (or one or more components thereof) may be removably interfaced with computer system 2000 (e.g., via an external port connector (not shown)). Particularly, storage device 2024 and an associated machine-readable medium 2028 may provide nonvolatile and/or volatile storage of machine-readable instructions, data structures, program modules, and/or other data for computer system 2000. In one example, software 2020 may reside, completely or partially, within machine-readable medium 2028. In another example, software 2020 may reside, completely or partially, within processor 2004.

Computer system 2000 may also include an input device 2032. In one example, a user of computer system 2000 may enter commands and/or other information into computer system 2000 via input device 2032. Examples of an input device 2032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2032 may be interfaced to bus 2012 via any of a variety of interfaces (not shown) including, but not limited to, a serial interface, a parallel interface, a game port, a USB interface, a FIREWIRE interface, a direct interface to bus 2012, and any combinations thereof. Input device 2032 may include a touch screen interface that may be a part of or separate from display 2036, discussed further below. Input device 2032 may be utilized as a user selection device for selecting one or more graphical representations in a graphical interface as described above.

A user may also input commands and/or other information to computer system 2000 via storage device 2024 (e.g., a removable disk drive, a flash drive, etc.) and/or network interface device 2040. A network interface device, such as network interface device 2040, may be utilized for connecting computer system 2000 to one or more of a variety of networks, such as network 2044, and one or more remote devices 2048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2044, may employ a wired and/or a wireless mode of communication. In general, any network topology may be used. Information (e.g., data, software 2020, etc.) may be communicated to and/or from computer system 2000 via network interface device 2040.

Computer system 2000 may further include a video display adapter 2052 for communicating a displayable image to a display device, such as display device 2036. Examples of a display device include, but are not limited to, a liquid crystal display (LCD), a cathode ray tube (CRT), a plasma display, a light emitting diode (LED) display, and any combinations thereof. Display adapter 2052 and display device 2036 may be utilized in combination with processor 2004 to provide graphical representations of aspects of the present disclosure. In addition to a display device, computer system 2000 may include one or more other peripheral output devices including, but not limited to, an audio speaker, a printer, and any combinations thereof. Such peripheral output devices may be connected to bus 2012 via a peripheral interface 2056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aircraft, methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An aircraft with at least a multi-walled fuel tank, the aircraft comprising: a blended wing body; and
   the at least a multi-walled fuel tank attached to the blended wing body and configured to store liquified gas fuel, wherein the at least a fuel tank further comprises:
   an inner wall;
   an outer wall; and
   an interstitial volume between the inner wall and the outer wall comprising of at least a reflective film layer and at least a structural insulation layer, wherein the at least a structural layer is divided into blocks, wherein the interstitial volume comprises a gap located between the blocks of the at least a structural insulation layer; and
   at least a vent fluidly connected to the interstitial volume, wherein the at least a vent is further connected to the gap, and configured to vent gas from the gap at a purge flow rate sufficient to maintain a fuel gas concentration within the interstitial volume below a threshold gas concentration.

2. The aircraft of claim 1, wherein the threshold gas concentration is at or below a concentration needed for combustion.

3. The aircraft of claim 1, wherein the liquified gas fuel is liquid hydrogen.

4. The aircraft of claim 3, wherein the threshold gas concentration is at or below 4%.

5. The aircraft of claim 1, wherein the inner wall comprises carbon epoxy.

6. The aircraft of claim 1, wherein the inner wall comprises an aluminum liner.

7. The aircraft of claim 1, wherein the interstitial volume has an absolute pressure of about 0 to 5 PSI.

8. The aircraft of claim 1, wherein the outer wall comprises one or more of aluminum and steel.

9. The aircraft of claim 1, wherein the outer wall is corrugated.

10. The aircraft of claim 1, wherein the outer wall is configured to change sizes due to an evacuation of the interstitial volume.

11. The aircraft of claim 1, wherein the at least a structural insulation layer includes aerogel.

12. The aircraft of claim 1, wherein the at least a reflective film layer comprises a metallized plastic film.

13. The aircraft of claim 1, wherein the at least a fuel tank comprises a multi-bubble tank.

14. The aircraft of claim 1, wherein the at least a fuel tank is located in a transitional portion of the blended wing body.

15. The aircraft of claim 1, wherein the at least a fuel tank is located in a main body of the blended wing body.

16. The aircraft of claim 15, wherein the at least a fuel tank is at a longitudinal center of the main body.

17. The aircraft of claim 1, wherein a center of gravity of the at least a tank is located aft of a center-of-gravity of the aircraft.

18. The aircraft of claim 1, further comprising a sensing system comprising at least a gas sensor, wherein the at least a gas sensor is located within a gap of the interstitial volume and wherein the at least a gas sensor is configured to monitor purge flow rate by measuring velocity of a gas.

19. The aircraft of claim 18, wherein the at least a gas sensor is configured to detect fuel gas concentration and control, using the at least a vent, venting of the gas from the gap when a threshold gas concentration value is detected.

* * * * *